(12) United States Patent
Noguchi

(10) Patent No.: US 10,776,854 B2
(45) Date of Patent: Sep. 15, 2020

(54) MERCHANDISE RECOMMENDATION DEVICE, MERCHANDISE RECOMMENDATION METHOD, AND PROGRAM

(71) Applicant: FUJIFILM Corporation, Tokyo (JP)

(72) Inventor: Yukinori Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 413 days.

(21) Appl. No.: 15/690,297

(22) Filed: Aug. 30, 2017

(65) Prior Publication Data

US 2017/0364991 A1    Dec. 21, 2017

Related U.S. Application Data

(63) Continuation of application No. PCT/JP2016/054931, filed on Feb. 19, 2016.

(30) Foreign Application Priority Data

Mar. 16, 2015 (JP) ................................. 2015-052212

(51) Int. Cl.
*G06Q 30/00* (2012.01)
*G06Q 30/06* (2012.01)

(52) U.S. Cl.
CPC ......... *G06Q 30/0631* (2013.01); *G06Q 30/06* (2013.01); *G06Q 30/0643* (2013.01)

(58) Field of Classification Search
CPC .............................................. G06Q 30/06–08
(Continued)

(56) References Cited

U.S. PATENT DOCUMENTS

2008/0215453 A1 * 9/2008 Yoshii .................... G06Q 30/02
705/7.29

FOREIGN PATENT DOCUMENTS

JP    2002123753    4/2002
JP    2003108593    4/2003
(Continued)

OTHER PUBLICATIONS

"Written Opinion of the International Searching Authority (Form PCT/ISA/237)" of PCT/JP2016/054931, dated May 17, 2016, with English translation thereof, pp. 1-10.
(Continued)

*Primary Examiner* — Ethan D Civan
(74) *Attorney, Agent, or Firm* — JCIPRNET

(57) ABSTRACT

There are provided a merchandise recommendation device, a merchandise recommendation method, and a program which recommend coordination merchandise based on a sensitivity word according to a trend. A merchandise recommendation device 10 includes a basic merchandise specification unit 31, a recommendation merchandise specification unit 33, and a recommendation merchandise information output unit 34. The basic merchandise specification unit 31 specifies first merchandise. The recommendation merchandise specification unit 33 specifies recommendation merchandise associated with the first merchandise, among multiple pieces of merchandise belonging to a category different from a category to the first merchandise belongs, based on trend information and coordination information based on the sensitivity word. The basic merchandise specification unit 31 outputs information of the recommendation merchandise.

21 Claims, 15 Drawing Sheets

(58) Field of Classification Search
USPC .............................................. 705/26.1–27.2
See application file for complete search history.

(56) References Cited

FOREIGN PATENT DOCUMENTS

| | | |
|---|---|---|
| JP | 2005092721 | 4/2005 |
| JP | 2008198163 | 8/2008 |
| JP | 2009128995 | 6/2009 |
| JP | 2010055391 | 3/2010 |
| JP | 2013250743 | 12/2013 |
| JP | 2014238788 | 12/2014 |
| JP | 2016071537 | 5/2016 |
| JP | 2016071609 | 5/2016 |

OTHER PUBLICATIONS

"International Search Report (Form PCT/ISA/210) of PCT/JP2016/054931", dated May 17, 2016, with English translation thereof, pp. 1-5.

* cited by examiner

FIG. 6

| SENSITIVITY WORD | DYADIC COLOR SCHEME | TRIADIC COLOR SCHEME | TETRADIC COLOR SCHEME | ... |
|---|---|---|---|---|
| CASUAL | {#7 #10} {#32 #61} ... | {#10 #15 #38} {#5 #10 #12} ... | {#10 #12 #20 #35} {#13 #16 #30 #60} ... | ... |
| ELEGANT | {#19 #60} {#14 #84} ... | {#19 #25 #39} {#10 #30 #64} ... | {#5 #12 #28 #80} {#5 #19 #60 #120} ... | ... |
| ... | ... | ... | ... | ... |

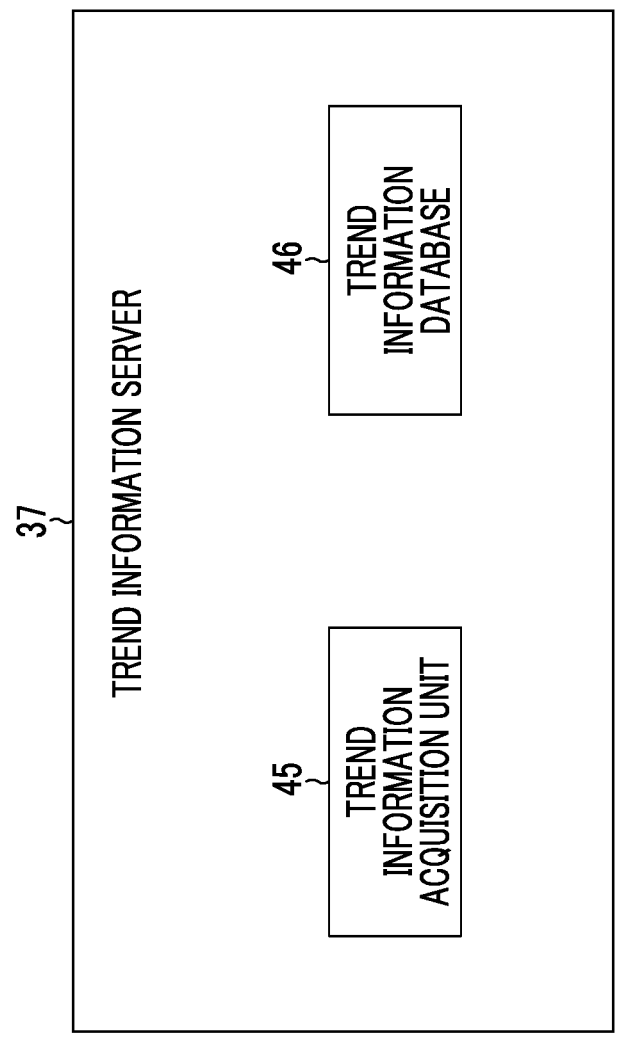

FIG. 8

| MERCHANDISE IDENTIFICATION CODE | CATEGORY | MERCHANDISE IMAGE | DESIGN FEATURE INFORMATION ||||| EC SERVER (STORE) | BRAND | INVENTORY | SIZE | PRICE |
| --- | --- | --- | --- | --- | --- | --- | --- | --- | --- | --- | --- | --- |
| | | | COLOR INFORMATION | PATTERN INFORMATION | SHAPE INFORMATION | TEXTURE INFORMATION | SENSITIVITY WORD INFORMATION | | | | | |
| AAA··· | TOPS | ⇧ | H=··· S=··· V=··· | PATTERN SIZE:··· PATTERN DENSITY:··· | SHAPE OF NECK BAND V-SHAPED NECK | GLOSSINESS :··· TRANSPARENCY :··· | CASUAL | EC2 | A COMPANY | REMAINING THREE ITEMS | M | ··· |
| BBB··· | BOTTOMS | ∇ | H=··· S=··· V=··· | PATTERN SIZE:··· PATTERN DENSITY:··· | NARROWNESS /THICKNESS | GLOSSINESS :··· TRANSPARENCY :··· | ELEGANT | EC6 | C COMPANY | REMAINING ONE ITEM | FREE | ··· |
| ··· | ··· | ··· | ··· | ··· | ··· | ··· | ··· | ··· | ··· | ··· | ··· | ··· |

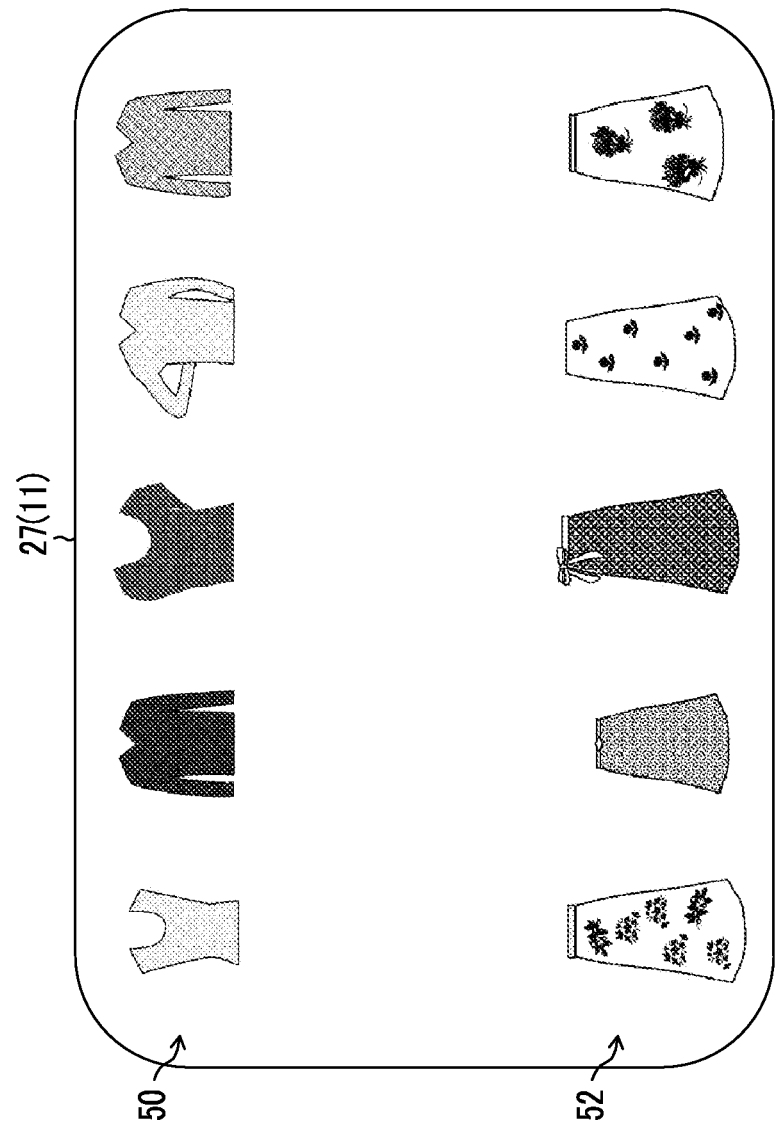

MERCHANDISE RECOMMENDATION DEVICE, MERCHANDISE RECOMMENDATION METHOD, AND PROGRAM

CROSS-REFERENCE TO RELATED APPLICATIONS

This application is a Continuation of PCT International Application No. PCT/JP2016/054931 filed on Feb. 19, 2016, which claims priority under 35 U.S.C § 119(a) to Patent Application No. 2015-052212 filed in Japan on Mar. 16, 2015, all of which are hereby expressly incorporated by reference into the present application.

BACKGROUND OF THE INVENTION

1. Field of the Invention

The present invention relates to a merchandise recommendation device, a merchandise recommendation method, and a non-transitory computer readable recording medium storing a program, and particularly, to a technology for recommending coordination merchandise corresponding to a trend.

2. Description of the Related Art

In a case where merchandise such as clothes is retrieved on an electronic commerce (EC) site on the Internet, pieces of merchandise may be generally narrowed down by designating price, size, color, and the like. For example, if a user designates a desired color of clothes on a web page, a list of clothes images related to the designated color is displayed, and the user selects a desired clothes image from the list of the displayed clothes images. Thus, the user can purchase the clothes of the selected image. In order to improve convenience in retrieving the merchandise, various methods have been suggested.

For example, JP2010-55391A discloses a merchandise analysis device that automatically analyzes sales or trends by automatically extracting features of merchandise from a merchandise image. JP2003-108593A discloses a narrowing retrieval device that is capable of easily retrieving the combination of pieces of appropriate coordination merchandise and is capable of easily acquiring an image acquired by imaging a user who wears the retrieved merchandise. JP2009-128995A discloses a merchandise affinity calculation device that supports user purchase of clothing accessories via a network without applying a large burden on seller's site by analyzing an image of clothing accessories and automatically performing ideal combination. JP2014-238788A discloses a color-relevant information retrieval support method for reducing an effort to find merchandise having a favorite color.

SUMMARY OF THE INVENTION

As mentioned above, various technologies related to the merchandise retrieval have been suggested. However, it is difficult to efficiently find desired merchandise, and there are some cases where it takes an effort to retrieve the merchandise. Particularly, it is not necessarily easy for a general user who does not have specialized knowledge to find coordination merchandise to be appropriately combined with specific basic merchandise (first merchandise).

Users have different preferences for the clothing accessories, and a personal preference of each user is changed with time. There are some cases where the user is not able to accurately express their preference or the user is not able to accurately ascertain their potential preference. It is possible to effectively prompt a user sensitive to a trend to determine final merchandise purchase by recommending fashion coordination being in fashion. Thus, a retrieval technology based on a sensitivity word that reflects the trend is effective as means for causing the user to simply retrieve desired coordination merchandise. That is, merchandise which is coordination merchandise based on the sensitivity word and reflects the trend is presented as recommendation merchandise to the user, and thus, the user can efficiently check coordination merchandise appropriate for their preference. Accordingly, it is possible to effectively stimulate purchasing motivation of the user.

In the related art, a technology for actively recommending the "coordination merchandise based on the sensitivity word that reflects the trend" to the user has not been suggested. For example, in the merchandise analysis device of JP2010-55391A, the trend is automatically analyzed, but the coordination merchandise for the specific basic merchandise (first merchandise) is not recommended based on the sensitivity word. In the narrowing retrieval device of JP2003-108593A, the coordination merchandise is retrieved, but the coordination merchandise for the specific merchandise is not recommended based on the sensitivity word. The merchandise affinity calculation device of JP2009-128995A is a technology for performing the ideal combination of the clothing accessories, but the coordination merchandise for the specific merchandise is not recommended based on the sensitivity word. In the color-relevant information retrieval support method of JP2014-238788A, an image is displayed based on association information associated with the selected color of the user, but the coordination merchandise for the specific merchandise is not recommended based on the sensitivity word.

The present invention has been made in view of the above-described circumstances, and it is an object of the present invention to provide a technology for recommending coordination merchandise based on a sensitivity word depending on a trend.

Solution to Problem

According to an aspect of the present invention, there is provided a merchandise recommendation device comprising: a basic merchandise specification unit that specifies first merchandise; a recommendation merchandise specification unit that specifies recommendation merchandise which is associated with the first merchandise, among multiple pieces of merchandise belonging to a category different from a category to which the first merchandise belongs, based on trend information and coordination information based on a sensitivity word; and a recommendation merchandise information output unit that outputs information of the recommendation merchandise.

According to the present aspect, the recommendation merchandise associated with the first merchandise is specified based on the coordination information based on the sensitivity word and the trend information. Accordingly, it is possible to recommend coordination merchandise which is related to the first merchandise and is specified based on the sensitivity word according to the trend.

Preferably, the merchandise recommendation device further comprises: a trend information acquisition unit that analyzes design feature information items of multiple pieces of analyzing target merchandise, and acquires the trend information.

According to the present aspect, it is possible to acquire appropriate trend information based on the design feature information items of the multiple pieces of analyzing target merchandise.

Preferably, the trend information acquisition unit acquires the number of pieces of merchandise having a common design feature among the multiple pieces of analyzing target merchandise, and acquires the trend information depending on the number of pieces of merchandise having the common design feature.

According to the present aspect, the trend information is appropriately acquired according to the number of pieces of merchandise having the common design feature.

Preferably, the trend information acquisition unit acquires the trend information depending on the number of increased or decreased pieces of merchandise having the common design feature during a reference period.

According to the present aspect, the trend information is appropriately acquired depending on the number of increased or decreased pieces of merchandise having the common design feature during the reference period. The "reference period" is a period for determining a change of the trend. For example, one day (24 hours), one week (seven days), two weeks (fourteen days), or one month may be set as the "reference period".

Preferably, the trend information acquisition unit acquires the trend information by comparing the number of increased pieces of merchandise having the common design feature during the reference period with a first threshold.

According to present aspect, since the trend information is acquired by comparing the number of increased pieces of merchandise having the common design feature with the first threshold, appropriate trend information acquired by reflecting the number of increased pieces of merchandise having the common design feature is acquired. The "first threshold" is not particularly limited, but it is preferable that the first threshold is determined depending on the reference period.

Preferably, the trend information acquisition unit acquires the trend information depending on a season when the number of increased pieces of merchandise having the common design feature during the reference period exceeds the first threshold.

According to the present aspect, since the trend information is acquired depending on the season when the number of increased pieces of merchandise having the common design feature during the reference period exceeds the first threshold, the trend information can appropriately follow a temporal change of the trend.

Preferably, the trend information acquisition unit acquires the trend information depending on a season when the number of pieces of merchandise having the common design feature exceeds a second threshold.

According to the present aspect, since the trend information is acquired depending on the season when the number of pieces of merchandise having the common design feature exceeds the second threshold, the trend information can appropriately follow a temporal change of the trend.

Preferably, the trend information acquisition unit acquires the trend information based on the design feature information items of the multiple pieces of analyzing target merchandise in a first specification season and the design feature information items of the multiple pieces of analyzing target merchandise in a second specification season different from the first specification season.

According to the present aspect, since the trend information is acquired based on the design feature information items of the multiple pieces of analyzing target merchandise during the first specification season and the second specification season, appropriate trend information can be acquired by comparing the design feature information items of the multiple pieces of analyzing target merchandise during different periods. The first specification season and the second specification season are not particularly limited, and may be different seasons from each other, may be the same season, may be continuous periods, or may be a non-continuous period (for example, the same seasons in different years).

Preferably, the trend information acquisition unit acquires representative data items of design features of the multiple pieces of analyzing target merchandise, and acquires the trend information depending on the representative data items.

According to the present aspect, since the trend information is acquired depending on the representative data items of the design features of the multiple pieces of analyzing target merchandise, appropriate trend information acquired by reflecting the representative data of the design feature is acquired. The representative data of the design feature is not particularly limited, and may be data items such as color, a pattern, a shape, and texture which directly indicate the design features, or may be data items such as sensitivity words which indirectly indicate the design features.

Preferably, the multiple pieces of analyzing target merchandise are based on sales merchandise.

According to the present aspect, the trend information is acquired based on the sales merchandise.

Preferably, the multiple pieces of analyzing target merchandise are based on merchandise belonging to a specific store.

According to the present aspect, the trend information is acquired based on the merchandise belonging to the specific store.

Preferably, the multiple pieces of analyzing target merchandise are based on merchandise belonging to a specific brand.

According to the present aspect, the trend information is acquired based on the merchandise belonging to the specific brand.

Preferably, the multiple pieces of analyzing target merchandise are based on merchandise belonging to a specific community.

According to the present aspect, the trend information is acquired based on the merchandise belonging to the specific community.

Preferably, the multiple pieces of analyzing target merchandise are based on merchandise belonging to an individual.

According to the present aspect, the trend information is acquired based on the merchandise belonging to the individual.

Preferably, the design feature information is based on a sensitivity word derived from at least one of color information, pattern information, shape information, or texture information.

According to the present aspect, the trend information is acquired based on the sensitivity word derived from at least one of the color information, the pattern information, the shape information, or the texture information.

Preferably, the first merchandise is a single piece of merchandise.

According to the present aspect, the recommendation merchandise is specified for a single piece of first merchandise.

Preferably, the first merchandise is multiple pieces of merchandise.

According to the present aspect, the recommendation merchandise is specified for multiple pieces of first merchandise.

Preferably, the recommendation merchandise is clothing accessories.

According to the present aspect, the clothing accessories are specified and output as the recommendation merchandise for the first merchandise.

Preferably, the basic merchandise specification unit specifies the first merchandise based on terminal transmission information sent from a terminal device.

According to the present aspect, the recommendation merchandise associated with the first merchandise specified through the terminal device is specified and output.

According to another aspect of the present invention, there is provided a merchandise recommendation method comprising: a step of specifying first merchandise; a step of specifying recommendation merchandise associated with the first merchandise, among multiple pieces of merchandise belonging to a category different from a category to which the first merchandise belongs, based on coordination information based on trend information and a sensitivity word; and a step of outputting information of the recommendation merchandise.

According to still another aspect of the present invention, there is provided a non-transitory computer readable recording medium storing a program causing a computer to perform: a procedure of specifying first merchandise; a procedure of specifying recommendation merchandise associated with the first merchandise, among multiple pieces of merchandise belonging to a category different from a category to which the first merchandise belongs, based on trend information and coordination information based on a sensitivity word; and a procedure of outputting information of the recommendation merchandise.

Advantageous Effects of Invention

According to the present invention, recommendation merchandise associated with first merchandise can be specified based on trend information and coordination information based on a sensitivity word, and coordination merchandise specified based on the sensitivity word can be recommended according to a trend.

BRIEF DESCRIPTION OF THE DRAWINGS

FIG. 6 is a conceptual diagram showing an example of coordination information.

FIG. 7 is a block diagram showing an example of a functional configuration of a trend information server.

FIG. 8 is a conceptual diagram showing an example of merchandise information stored in a merchandise information server.

FIG. 10 is a diagram showing a display example of the recommendation merchandise on the display unit of the terminal device.

FIG. 11A is a graph showing the number of pieces of merchandise of which a representative color is pink, FIG. 11B is a graph showing the number of pieces of merchandise of which a representative pattern is a leopard pattern, and FIG. 11C is a graph showing a size of a representative stripe width as a feature value.

DESCRIPTION OF THE PREFERRED EMBODIMENTS

Hereinafter, an embodiment of the present invention will be described with reference to the accompanying drawings.

Although an example in which "clothing accessories" including clothing and accessories are used as recommendation merchandise will be described in the following embodiment, the present invention is not limited thereto, and the present invention may be employed to a case where merchandise belonging to an arbitrary category capable of coordinating with another merchandise is used as the recommendation merchandise.

Figure 1:
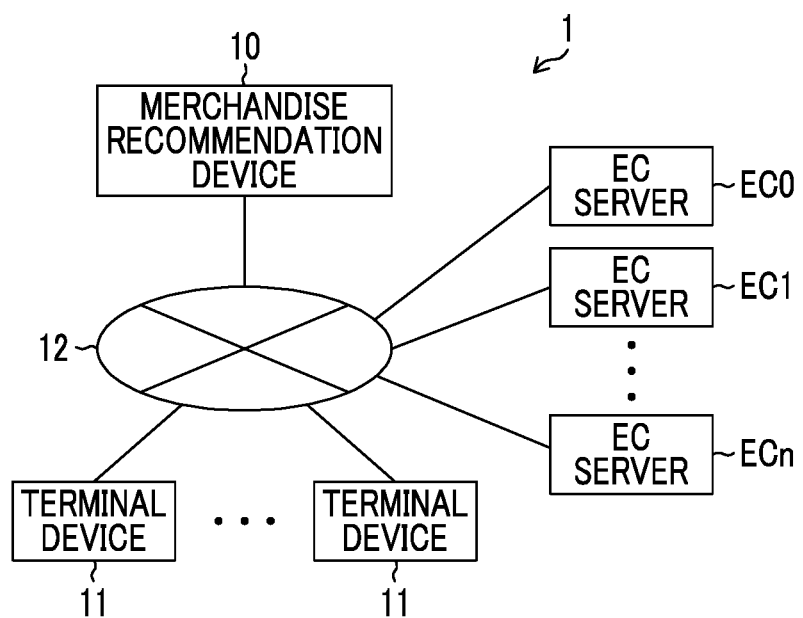
FIG. 1 is a conceptual diagram of a client server system including a merchandise recommendation device according to an embodiment of the present invention.

FIG. 1 is a conceptual diagram of a client server system 1 including a merchandise recommendation device 10 according to an embodiment of the present invention. In the client server system 1 according to the present embodiment, the merchandise recommendation device 10, a plurality of terminal devices 11, and a plurality of EC servers EC0 to ECn (here, "n" is an arbitrary natural number) are connected to each other via a network 12 such as the Internet.

The merchandise recommendation device 10 determines the recommendation merchandise (second merchandise) appropriate for being combined with basic merchandise (first merchandise), and outputs information of the recommendation merchandise. The form of the merchandise recommendation device 10 is not particularly limited. For example, the merchandise recommendation device 10 itself may establish an EC site in which electronic commerce is conducted, or the merchandise recommendation device 10 may cooperate with other EC servers EC0 to ECn that establish the EC site. In a case where the merchandise recommendation device 10 establishes the EC site, the merchandise recommendation device 10 may output the information of the recommendation merchandise to the terminal device 11 that accesses the merchandise recommendation device 10. In a case where the merchandise recommendation device 10 cooperates with the other EC servers EC0 to ECn, the merchandise recommendation device 10 may output the information of the recommendation merchandise required in the other EC server.

The terminal device 11 is a terminal operated by a user. The form of the terminal device is not particularly limited, and for example, portable devices (for example, smartphones, tablet devices, and laptops) or stationary devices (for example, desktop computers) may be used as the terminal devices 11.

The EC servers EC0 to ECn directly provide information items regarding the merchandise (for example, information items regarding a merchandise image, a brand, an inventory, price, a size, recommended merchandise, and purchasing information) to the merchandise recommendation device 10 and the terminal devices 11, or provide indirectly the information items regarding the merchandise to the merchandise recommendation device 10 and the terminal devices 11 through another device over the network 12.

Figure 2:
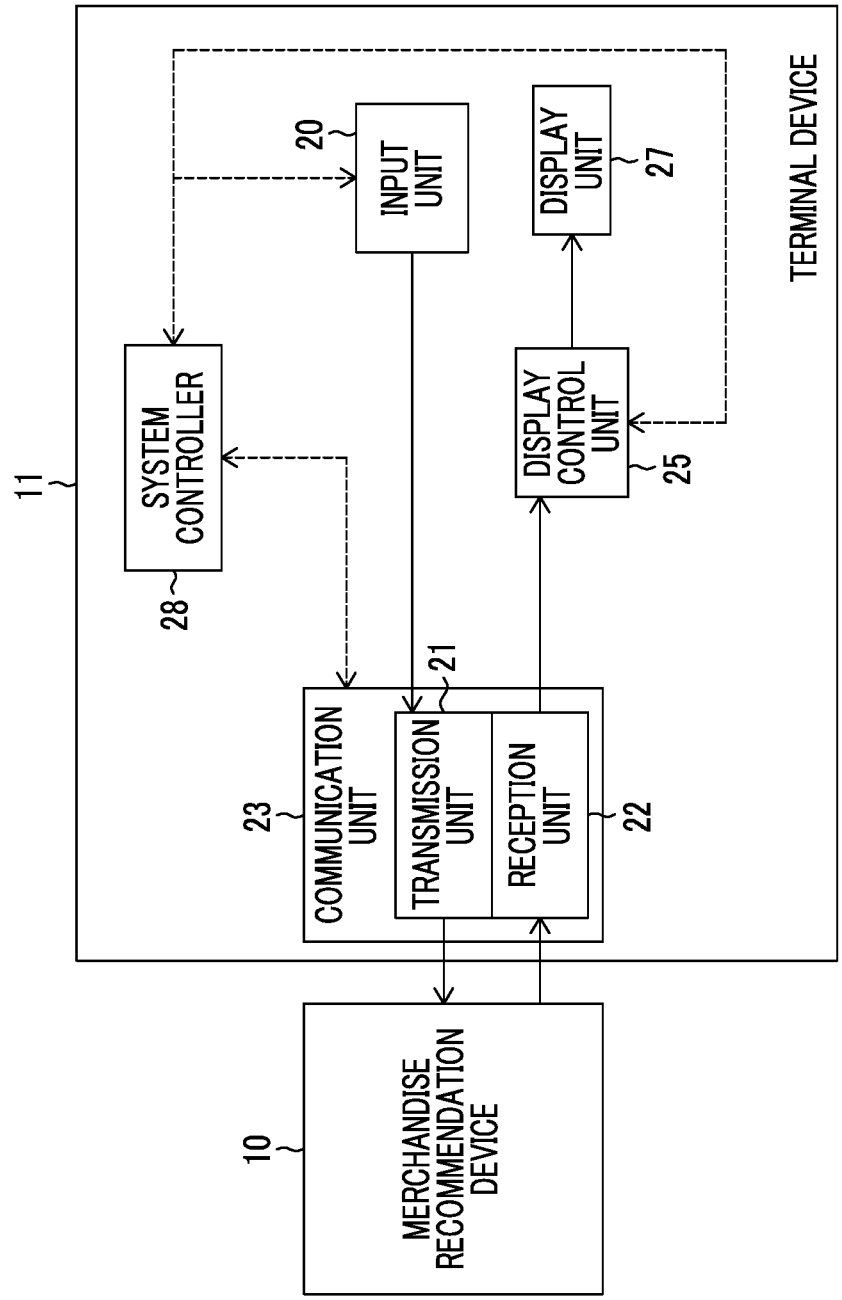
FIG. 2 is a block diagram showing a functional configuration example of a terminal device.

FIG. 2 is a block diagram showing a functional configuration example of the terminal device 11. Although an example in which the terminal device 11 communicates with the merchandise recommendation device 10 will be described in the following description of the terminal device 11, the terminal device 11 may communicate with the EC servers EC0 to ECn or other external devices connected via the network 12.

The terminal device 11 of the present example includes an input unit 20, a communication unit 23 (a transmission unit 21 and a reception unit 22), a display control unit 25, a display unit 27, and a system controller 28.

The communication unit 23 transmits and receives data to and from an external device (the merchandise recommendation device 10 in the present example) via the network 12 under the control of the system controller 28. For example, the data received from the system controller 28 is transmitted to the external device through the transmission unit 21, and the data received from the external device through the reception unit 22 is transmitted to the system controller 28.

The input unit 20 is a part directly operated by the user in order to input the data, and transmits data including a command input in response to a user operation to the system controller 28. The input unit 20 may be typically constituted by various devices such as a mouse or a keyboard, but is not particularly limited. The terminal input unit may be constituted by hardware and/or software. For example, in a case where the terminal device 11 is a portable device such as a smartphone or a tablet terminal, the input unit 20 may include software keys using a touch panel, the input unit 20 may include hardware keys such as buttons provided at the terminal device 11, or the input unit 20 may include combinations of the software keys and the hardware keys.

For example, in a case where the input unit 20 is constituted by a touch panel integrally provided with the display unit 27 of the terminal device 11, the user may operate the input unit 20 by touching a transparent touch panel on the display unit 27. The system controller 28 may recognize inputs such as selection and designation of various processes performed by the user based on an operation signal sent from the touch panel (input unit 20) corresponding to a touch position or a touch operation (including, for example, a tapping operation, a double tapping operation, a swiping operation, a clicking operation, a pinching operation, and a dragging operation) on the touch panel. The user can input data by an arbitrary method through the input unit 20. The user may directly input data, or may input data by selecting one or more desired data items among a plurality of candidates displayed on the display unit 27.

The display control unit 25 is controlled by the system controller 28, and controls the display unit 27 to control overall display on the display unit 27. For example, information regarding each piece of merchandise or a retrieved result of the merchandise image sent from the external device (the merchandise recommendation device 10 in the present example) to the terminal device 11 (communication unit 23) or data input by the user through the input unit 20 are may be displayed on the display unit 27 under the control of the display control unit 25.

The system controller 28 controls the communication unit 23, the input unit 20, the display control unit 25, and other devices constituting and the terminal device 11, and performs the transmission and reception of data to and from various devices constituting the terminal device 11, perform the transmission and reception of data to and from an external device (the merchandise recommendation device 10 in the present example) through the communication unit 23, or performs various processes.

For example, the user can input various data items by operating the terminal device 11, and the user can input a user identification (ID) and a password in order to perform an authentication process. The user ID and the password are data items for specifying the user who operates the terminal device 11, and hereinafter, any one of the user ID and the password or the combination thereof is referred to as "user identification data".

Figure 3:
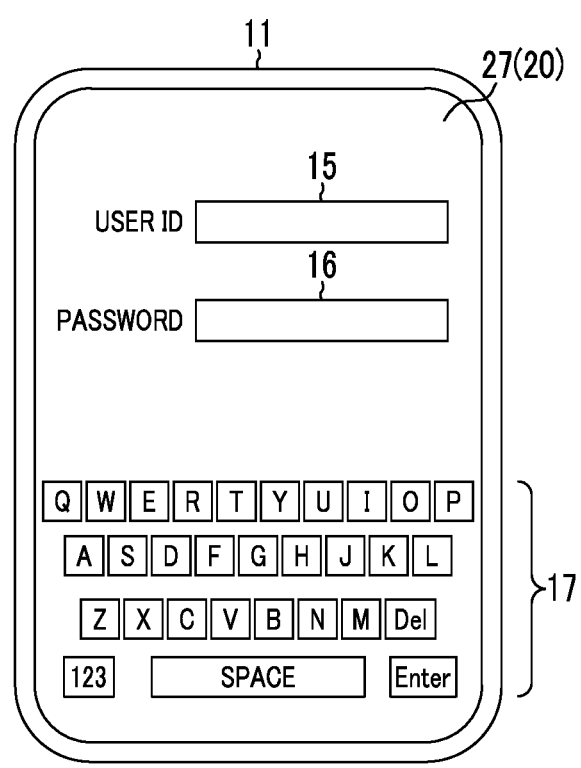
FIG. 3 shows an example of an input screen of user identification data displayed on a display unit of the terminal device.

FIG. 3 shows an example of an input screen of the user identification data displayed on the display unit 27 of the terminal device 11. In the present example, a portable device including, as the input unit 20, a touch panel provided on the display unit 27 is used as the terminal device 11.

In order to authenticate that the user is an appropriate user, the user inputs the user ID and the password set to each user to the terminal device 11. In the example shown in FIG. 3, a user ID data input field 15, a password input field 16, and a software keyboard 17 are displayed on the display unit 27. The user ID data input field 15 is a field in which the user inputs the user ID, and the password input field 16 is a field in which the user inputs the password. The user inputs the assigned user ID in the user ID data input field 15 and inputs the password in the password input field 16 by using the software keyboard 17.

The software keyboard 17 is constituted by an arbitrary character palette and a touch panel (display unit 27) displayed on the display unit 27. The user touches a portion of the touch panel corresponding to each character palette displayed on the display unit 27, and thus, the characters corresponding to a touched position is input in the user ID data input field 15 or the password input field 16. The character palette displayed as the software keyboard 17 on the display unit 27 is not particularly limited, and function keys such as a space key, an enter key, a delete key, and a display switch key may be displayed as the software keyboard 17 on the display unit 27, in addition to characters for inputting Hiragana (Japanese syllabary), alphabets, numbers, and symbols.

For example, a touch panel (display unit 27) in a position corresponding to the user ID data input field 15 is touched by the user, and thus, the terminal device 11 (system controller 28) is changed to a user ID input mode. The user can input the user 1D in the user ID data input field 15 by using the software keyboard 17. Similarly, for example, the touch panel in a position corresponding to the password input field 16 is touched by the user, and thus, the terminal device 11 (system controller 28) is changed to a password input mode. The user can input the password in the password input field 16 by using the software keyboard 17. In a state in which the user identification data and the password are input, a position corresponding to the enter key of the software keyboard 17 is touched by the user, and thus, the user authentication process is performed. The user authentication process is performed by an arbitrary process procedure, and in the present example, the merchandise recommendation device 10 determines whether or not the input user identification data is appropriate.

Figure 4:
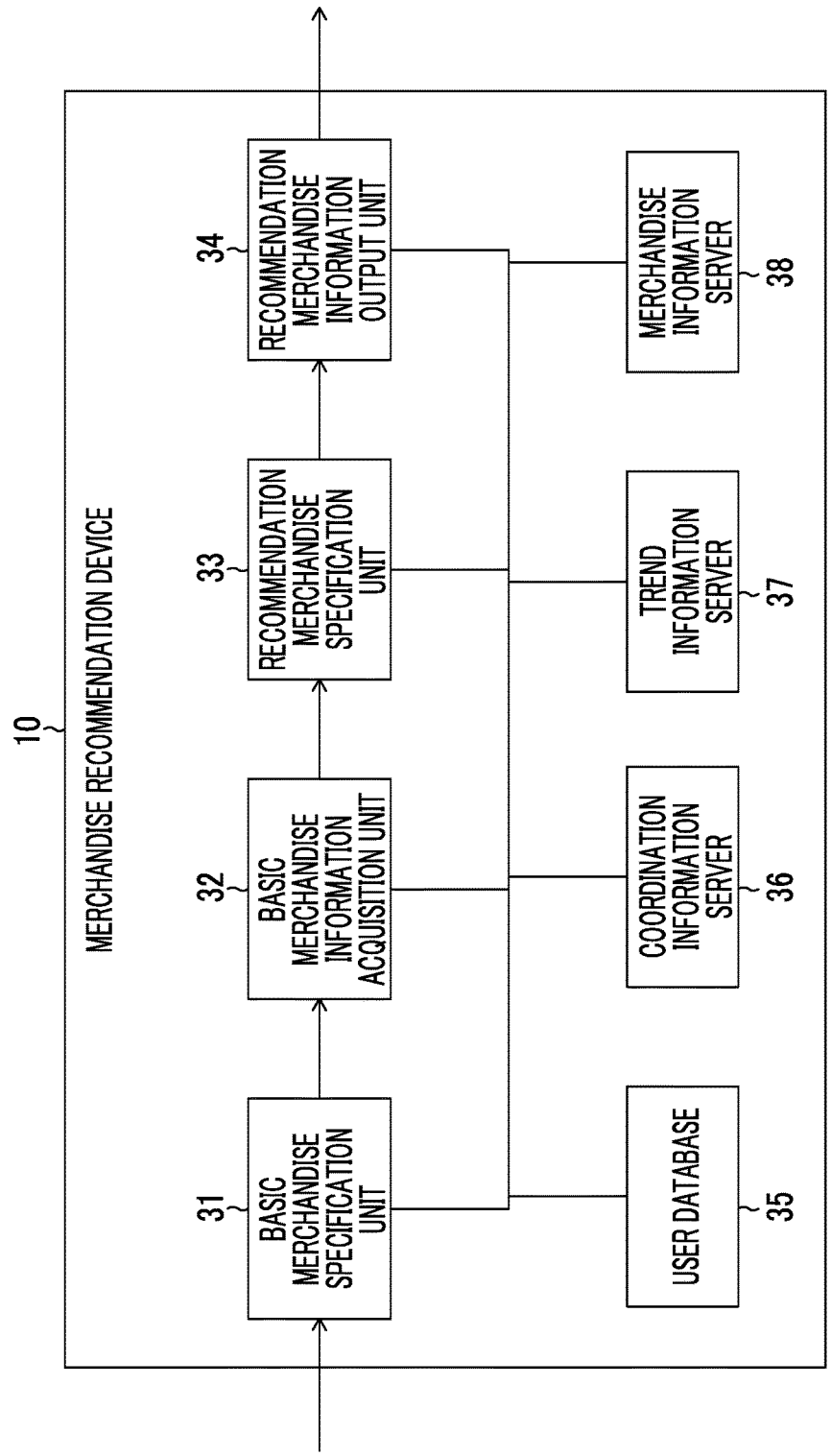
FIG. 4 is a block diagram showing a functional configuration of the merchandise recommendation device related to specification and output processes of recommendation merchandise.

FIG. 4 is a block diagram showing a functional configuration of the merchandise recommendation device 10 related to specification and output processes of the recommendation merchandise.

The merchandise recommendation device 10 of the present example is a device that specifies the recommendation merchandise capable of coordinating specific basic merchandise (first merchandise) determined depending on the user, and includes a basic merchandise specification unit 31, a basic merchandise information acquisition unit 32, a recommendation merchandise specification unit 33, a recommendation merchandise information output unit 34, a user database 35, a coordination information server 36, a trend information server 37, and a merchandise information server 38.

Functional blocks thereof included in the merchandise recommendation device 10 may be realized by an integrally provided device, or may be realized by the combination of a plurality of device. For example, the basic merchandise specification unit 31, the basic merchandise information acquisition unit 32, the recommendation merchandise specification unit 33, and the recommendation merchandise information output unit 34 may be integrally provided, and the user database 35, the coordination information server 36, the trend information server 37, and merchandise information server 38 are may be separate devices. These devices may be connected via the network 12.

The basic merchandise specification unit 31 specifies the basic merchandise (first merchandise) based on the input data. The basic merchandise (first merchandise) is determined depending on the user, and is merchandise intended to be combined with the recommendation merchandise. The data input to the basic merchandise specification unit 31 is not particularly limited, and terminal transmission information sent from the terminal device 11 may be input to the basic merchandise specification unit 31, or "user information associated with the user identification data" retained in the user database 35 may be input. For example, the terminal transmission information to be input to the basic merchandise specification unit 31 may include information (for example, merchandise identification code, merchandise image data, and another merchandise information) for specifying the basic merchandise, and the basic merchandise specification unit 31 may specify the basic merchandise (first merchandise) based on the terminal transmission information sent from the terminal device 11. Similarly, the user information to be input to the basic merchandise specification unit 31 may also include information for specifying specific basic merchandise, and information (for example, information regarding merchandise purchased by the user in the past, merchandise designated as favorite item by the user in the past, and merchandise browsed by the user in the past) for specifying the basic merchandise may be included in the user information. The basic merchandise specification unit 31 may directly specify the basic merchandise (first merchandise) based on the input data, or may indirectly specify the basic merchandise (second merchandise). For example, in a case where information (for example, a merchandise identification code and another merchandise information) capable of directly specifying the basic merchandise is included in the input data, the basic merchandise specification unit 31 may directly specify the basic merchandise. Meanwhile, in a case where information (for example, merchandise image data and another merchandise information) capable of indirectly specifying the basic merchandise is included in the input data, the basic merchandise specification unit 31 may specify the basic merchandise by analyzing (for example, image analysis) of the data to be input.

The basic merchandise (first merchandise) specified by the basic merchandise specification unit 31 may be a single piece of merchandise, or may be multiple pieces of merchandise. For example, the user may designate the single piece or multiple pieces of merchandise as the basic merchandise through the terminal device 11, or the basic merchandise specification unit 31 may specify the single piece of basic merchandise or the multiple pieces of basic merchandise based on the user information. For example, a single piece or multiple pieces of merchandise selected from the merchandise purchased by the user in the past, the merchandise designated as the favorite item by the user in the past, and the merchandise browsed by the user in the past may be specified as the basic merchandise.

The basic merchandise information acquisition unit 32 acquires various information items of the basic merchandise specified by the basic merchandise specification unit 31. A method of causing the basic merchandise information acquisition unit 32 to acquire the information items of the basic merchandise is not particularly limited. For example, the basic merchandise information acquisition unit 32 may acquire various information items of the basic merchandise from the terminal transmission information, or may access the merchandise information server 38 and may acquire various information items of the basic merchandise from the merchandise information retained in the merchandise information server 38. The basic merchandise information acquisition unit 32 may acquire various information items of the basic merchandise by analyzing the merchandise image data of the basic merchandise. The information of the basic merchandise acquired by the basic merchandise information acquisition unit 32 is not particularly limited, and it is preferable that information useful to specify the recommendation merchandise is included. Accordingly, for example, at least one of color information, pattern information, shape information, texture information, or sensitivity information of the basic merchandise may be acquired by the basic merchandise information acquisition unit 32.

The recommendation merchandise specification unit 33 specifies the recommendation merchandise associated with the basic merchandise (first merchandise) from multiple pieces of merchandise belonging to a category different from a category to which the basic merchandise (first merchandise) belongs based on the coordination information based on sensitivity word and the trend information, which may includes fashion trend information for example. For example, in a case where the basic merchandise belongs to a category of "tops", the recommendation merchandise specification unit 33 may specify, as the recommendation merchandise, merchandise belonging to a category of "bottoms" capable of appropriately coordinating with the basic merchandise (tops). The category of the recommendation merchandise may be designated by the user through the terminal device 11, or may be automatically specified by the recommendation merchandise specification unit 33 based on the user information. For example, in a case where the category of the recommendation merchandise is designated by the user, the recommendation merchandise specification unit 33 may determine the category of the recommendation merchandise from "information of the category designated by the user" included in the terminal transmission information. In a case where the category of the recommendation merchandise is automatically specified based on the user information, the recommendation merchandise specification unit 33 may access the user database 35, and may determine the category of the recommendation merchandise according to an arbitrary algorithm from the user information stored in the user database 35.

The recommendation merchandise specification unit 33 of the present example accesses the coordination information server 36 to acquire the "coordination information based on the sensitivity word", accesses the trend information server 37 to acquire the "trend information", and specify the "recommendation merchandise" from the multiple pieces of merchandise of which the information items are retained in the merchandise information server 38 based on the "information of the basic merchandise", the "coordination information based on the sensitivity word", and the "trend information" input from the basic merchandise information acquisition unit 32.

In a case where the "information of the basic merchandise" input to the recommendation merchandise specification unit 33 from the basic merchandise information acquisition unit 32 is insufficient to specify the recommendation merchandise, the recommendation merchandise specification unit 33 may acquire the "information of the basic merchandise required to specify the recommendation merchandise".

Figure 5:
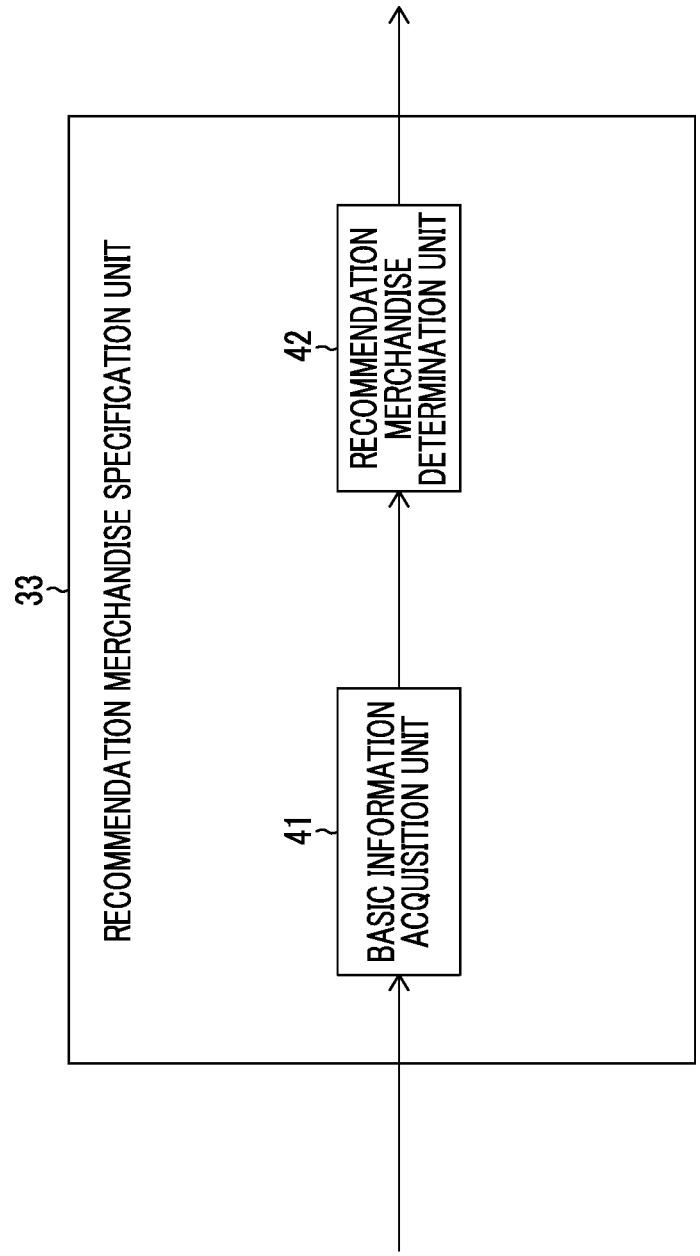
FIG. 5 is a block diagram showing an example of a functional configuration of a recommendation merchandise specification unit.

FIG. 5 is a block diagram showing an example of a functional configuration of the recommendation merchandise specification unit 33. The recommendation merchandise specification unit 33 may include a basic information acquisition unit 41 and a recommendation merchandise determination unit 42. The basic information acquisition unit 41 acquires the information of the basic merchandise required to specify the recommendation merchandise based on the information of the basic merchandise sent from the basic merchandise information acquisition unit 32. For example, the basic information acquisition unit 41 may acquire the "information of the basic merchandise required to specify the recommendation merchandise" from an external device such as the merchandise information server 38, and may acquire the "information of the basic merchandise required to specify the recommendation merchandise" by analyzing the terminal transmission information (for example, the merchandise image data). For example, the "information of the basic merchandise required to specify the recommendation merchandise" mentioned herein may include design feature information (color information, pattern information, shape information, texture information, and sensitivity information) of the basic merchandise.

The recommendation merchandise determination unit 42 specifies the "recommendation merchandise" based on the "information of the basic merchandise", the "coordination information based on the sensitivity word", and the "trend information" acquired by the basic information acquisition unit 41. For example, the recommendation merchandise determination unit 42 may specify the design feature information capable of appropriately coordinating with the basic merchandise based on the "coordination information based on the sensitivity word", may adjust the evaluation of the "design feature information of the merchandise capable of appropriately coordinating with the basic merchandise" based on the "trend information", and may preferentially specify merchandise having design feature information of which an evaluation score is relatively high", as the recommendation merchandise.

As one example, the recommendation merchandise determination unit 42 may calculates an evaluation score depending on the design feature information of each pieces of candidate merchandise based on the "coordination information based on the sensitivity word" and the "trend information" for each piece of candidate merchandise of the recommendation merchandise, and may specify the candidate merchandise having a high evaluation score, as the recommendation merchandise. A method of causing the recommendation merchandise determination unit 42 to calculate the evaluation score is not particularly limited. For example, the evaluation weight (evaluation point) of the design feature information items (for example, color information, pattern information, shape information, texture information, and sensitivity word information) of the merchandise may be acquired based on the "coordination information based on the sensitivity word", the evaluation weight (evaluation point) of the design feature information items may be adjusted depending on the "trend information", and the evaluation score may be calculated by using the adjusted evaluation weight (evaluation point) from the design feature information items of each piece of candidate merchandise. A specific specification method of the recommendation merchandise performed by the recommendation merchandise specification unit 33 is not particularly limited, and a specific example will be described below.

The recommendation merchandise information output unit 34 (see FIG. 4) outputs the information of the recommendation merchandise specified by the recommendation merchandise specification unit 33. The information of the recommendation merchandise output from the recommendation merchandise information output unit 34 is not particularly limited, and may be changed depending on an output destination. For example, in a case where the information of the recommendation merchandise is output to the teiminal device 11 from the recommendation merchandise information output unit 34 like a case where the merchandise recommendation device 10 itself establishes the EC site for performing the electronic commerce, information (for example, specification information of the recommendation merchandise, image information, and price information)

required to be displayed on the display unit 27 of the terminal device 11 may be output from the recommendation merchandise information output unit 34. Meanwhile, in a case where the information of the recommendation merchandise is output to another EC server from the recommendation merchandise information output unit 34 like a case where the merchandise recommendation device 10 supports other EC servers (see references "EC0", "EC1", and "ECn" of FIG. 1) that establish the EC site, the information (specification information of the recommendation merchandise) required in the other EC servers may be output from the recommendation merchandise information output unit 34. The recommendation merchandise information output unit 34 may access the merchandise information server 38, and may acquire the information of the output recommendation merchandise from the merchandise information server 38 if necessary.

The user database 35 stores various information items of the user as the user information such that these information items are associated with the user identification data items, and provides the user information to various devices if necessary. The user information is not particularly limited, and it is preferable that the information useful to specify the basic merchandise is included in the user information stored in the user database 35. For example, in a case where the basic merchandise is specified based on behavior history information (for example, a purchase history, a browsing history, and a favorite registration history) of the user, it is preferable that the user database 35 stores the behavior history information of the user. In this case, the basic merchandise specification unit 31 may access the user database 35, may acquire the history information of the user, and may specify the basic merchandise. The user database 35 may store various information items such as a specific store related to the user, a specific brand, a specific community, another relevant user, information of the merchandise belonging to (possessed by) an individual user, and the sensitivity word in which the user is interested such that these information items are associated with the user identification data items. In this case, the basic merchandise specification unit 31 may access the user database 35, may acquire various information items, and may specify the basic merchandise.

The coordination information server 36 stores the coordination information based on the sensitivity word, and provides the coordination information to various devices if necessary. In the present example, the coordination information stored by the coordination information server 36 is read by the recommendation merchandise specification unit 33, and the recommendation merchandise capable of coordinating with the basic merchandise is specified based on the coordination information.

The coordination information based on the sensitivity word stored by the coordination information server 36 is used for determining a rule for appropriately combining pieces of merchandise belonging to different categories based on the sensitivity word. For example, the sensitivity word may be previously assigned to the representative design features (for example, color, pattern, shape, and texture) of the merchandise, and the information of the sensitivity word associated with the information of the design feature may be stored as the coordination information in the coordination information server 36. The coordination information may be determined depending on the categories of the pieces of merchandise coordinating with each other. For example, in a case where the coordination information regarding the combination of the tops and the bottoms is used, the combination of the "design feature information of the tops" and the "design feature information of the bottoms" capable of appropriately coordinating with each other may be stored as the coordination information in the coordination information server 36 so as to be associated with the sensitivity word.

FIG. 6 is a conceptual diagram showing an example of the coordination information.

The example shown in FIG. 6 represents "the coordination information based on the sensitivity word" corresponding to color information, and defines a color scheme relationship between the basic merchandise and the recommendation merchandise. In this example, the sensitivity word and the color information of the color scheme are associated with each other for a plurality of color schemes (a dyadic color scheme, a triadic color scheme, and a tetradic color scheme) in which the number of colors is different.

For example, as color information of the dyadic color scheme to which a sensitivity word of "casual" is assigned, "#7, #10" and "#32, #61" are included in the coordination information. The combinations ("#1" to "#130") of the symbols and the numbers in FIG. 6 represents numbers of colors of a basic color palette using 130 colors. In the example shown in FIG. 6, although color information items (combinations of the numbers of the colors of the basic color palette) of the color scheme are assigned to sensitivity words of "casual" and "elegant", the relationship between the color information items of the color schemes and the sensitivity words shown in FIG. 6 is shown for the sake of convenience in the description, and such a relationship is not necessarily appropriate as the color information of the color scheme that is reminiscent of an actual sensitivity word.

In a case where the number of colors is 130, the number of combinations of colors using the dyadic color scheme is 8385, but the number of combinations of colors which appropriately coordinate with each other is less than 8385. This is because the inappropriate combinations of colors which are not coordinated by a coordinator of clothing are included in the 8385 combinations.

The combinations of the colors using the dyadic color scheme for the combined merchandise (the basic merchandise (first merchandise) and the recommendation merchandise (second merchandise)) coordinated by the coordinator of the clothing are classified for the sensitivity words, and are registered as the coordination information in the coordination information server 36 so as to be associated with the sensitivity words. Similarly, even in a case where the color scheme is the triadic color scheme and the tetradic color scheme, the combinations of the colors are classified for the sensitivity words, and are registered as the coordination information in the coordination information server 36 so as to be associated with the sensitivity words.

The trend information server 37 (see FIG. 4) stores the trend information, and provides the trend information to various devices if necessary. For example, the trend information is used for determining a rule that specifies the trend, and includes information regarding design features (for example, color, a pattern, a shape, and texture) of the fashion trend. A method of acquiring the trend information performed by the trend information server 37 is not limited, and the trend information is acquired by analyzing design feature information items of multiple pieces of analyzing target merchandise in the present example.

FIG. 7 is a block diagram showing an example of a functional configuration of the trend information server 37.

The trend information server 37 of the present example includes a trend information acquisition unit 45 and a trend information database 46.

For example, the trend information acquisition unit 45 acquires the trend information by analyzing the design feature information items of the multiple pieces of analyzing target merchandise, and acquires the trend information by analyzing the information based on at least one of color information, pattern information, shape information, or texture information, as the design feature information. The "multiple pieces of analyzing target merchandise" of which the design feature information items are analyzed by the trend information acquisition unit 45 are not particularly limited. For example, the trend information acquisition unit 45 may access the merchandise information server 38 (see FIG. 4), and may acquire the trend information by analyzing the merchandise information stored in the merchandise information server 38. More specifically, the trend information acquisition unit 45 may access the merchandise information server 38, and may acquire the trend information indicating the design feature of the trend by analyzing the merchandise information (for example, the design feature information and/or the merchandise image data of the merchandise) stored in the merchandise information server 38.

The "multiple pieces of analyzing target merchandise" which are targets to be analyzed by the trend information acquisition unit 45 may be determined based on the pieces of sales merchandise provided by the EC servers EC0 to ECn connected to the terminal device 11 via the network 12, the pieces of merchandise belonging to the specific store, the pieces of merchandise belonging to the specific brand, the pieces of merchandise belonging to the specific community, and the pieces of merchandise belonging to the individual person. The trend information acquisition unit 45 may determine the "multiple pieces of analyzing target merchandise" based on the user information capable of being specified by the user identification data, or may determine the "multiple pieces of analyzing target merchandise" based on information of the merchandise purchased by the user in the past, information of a merchandise sales site browsed by the user in the past or a merchandise introduction site, information of the community to which the user belongs, or information of another user (friend) who is related to the user. For example, the trend information acquisition unit 45 may acquire the user information from the user database 35.

For example, the trend information database 46 stores the trend information acquired by the trend information acquisition unit 45, and is accessed by the recommendation merchandise specification unit 33. Thus, the trend information is read.

The merchandise information server 38 (see FIG. 4) stores, merchandise information items, information items of "multiple pieces of merchandise belonging to various categories" including pieces of merchandise which are candidates of the recommendation merchandise, and provides the merchandise information items to various devices if necessary. In the present example, the recommendation merchandise specification unit 33 accesses the merchandise information server 38, and specifies the recommendation merchandise associated with the basic merchandise based on the merchandise information stored in the merchandise information server 38. The merchandise information stored in the merchandise information server 38 is not particularly limited. For example, information items of various pieces of merchandise such as the pieces of sales merchandise provided from the EC servers EC0 to ECn are stored in the merchandise information server 38.

FIG. 8 is a conceptual diagram showing an example of the merchandise information stored in the merchandise information server 38. In the present example, the merchandise information of which information items regarding a merchandise identification code, a category, a merchandise image, design feature information, a EC server (store), a brand, an inventory, a size, and price are associated with each other are stored in the merchandise information server 38. The merchandise identification code is assigned to each piece of merchandise, and is typically constituted by characters, numbers, and symbols. For example, the category indicates the purpose of use of the merchandise, and may be indicated by a name based on an arbitrary classification such as tops, bottoms, caps, underwear, socks, and accessories in the case of the clothing accessories. The merchandise image is image data indicating the merchandise, and is constituted by data indicating a single or a plurality of images. For example, the design feature information indicates the design feature of the merchandise, and is indicated by the "color, the pattern, the shape, and the texture (the color information, the pattern information, the shape information, and the texture information) of the merchandise" or the "sensitivity word (sensitivity word information) derived from the design information of the merchandise (for example, at least one of the color information, the pattern information, the shape information, or the texture information). The EC server (store) indicates any one of the EC servers EC0 to ECn which deal in the target merchandise as the sales merchandise, and includes information indicating a plurality of EC servers in a case where there is the plurality of EC servers. The brand indicates a brand assigned to the merchandise. The inventory indicates the number of pieces of merchandise of the EC servers EC0 to ECn which deal in the target merchandise as the sales merchandise. The size indicates the size of the merchandise. The price indicates sales price in the EC servers EC0 to ECn which deal in the target merchandise as the sales merchandise.

The color information as the design feature information shown in FIG. 8 is not particularly limited. For example, the color information may be indicated by a value (HSV value) of a HSV model represented by a color space constituted by three components of hue, saturation (or chroma), and value (or lightness or brightness). More specifically, the color information is indicated by the RSV value and information (basic color palette information) indicating a number of a color of a basic color palette corresponding to the HSV value. Accordingly, a group of a HSV value and basic color palette information in a case where the merchandise has a single color, and a plurality of groups of HSV values and basic color palette information items may be recorded in a case where the merchandise has a plurality of colors.

For example, the pattern information may be indicated by a feature value defined by pattern density and pattern size. The shape information is able to be indicated by a feature value specified by, for example, the entire width (narrow—wide), a sleeve length (short—long), the entire length (short—long), a width and a height of a neckline, a sectional area (small—large) of a space through which the head of the user defined by the neckline passes, an angle (narrow—wide) of a neck, and curvature (small—large) of the neck. For example, a texture feature value may be indicated by a feature value defined by glossiness and transparency.

The sensitivity word (sensitivity word information) may be determined based on the combination of the design feature information items (the color information, the pattern information, the shape information, and the texture information), or may be determined by additionally taking account of another information. For example, in a case where the sensitivity word is determined based on the color information, a specific sensitivity word is determined depending on the color scheme of the merchandise. A method of determining the sensitivity word (sensitivity word information) based on the combination of the design feature information items is not particularly limited. For example, the sensitivity word (sensitivity word information) may be appropriately determined from the color information according to an image scale disclosed in "COLOR SYSTEM (published by Kodansha Ltd.) written by Shigenobu Kobayashi".

For example, the design feature information items (the color information, the pattern information, the shape information, the texture information, and the sensitivity word information) may be acquired by analyzing the image data of the merchandise. Accordingly, the merchandise information server 38 or another device may acquire the design feature information items (the color information, the pattern information, the shape information, the texture information, and the sensitivity word information) by analyzing the image data of the merchandise, and may store the acquired design feature information in the merchandise information server 38.

According to the merchandise recommendation device 10, the recommendation merchandise capable of being appropriately combined with the basic merchandise is specified based on the "coordination information based on the sensitivity word" and the "trend information". Information of the specified recommendation merchandise is output, and is sent to the terminal device 11 or the EC servers EC0 to ECn.

Figure 9:
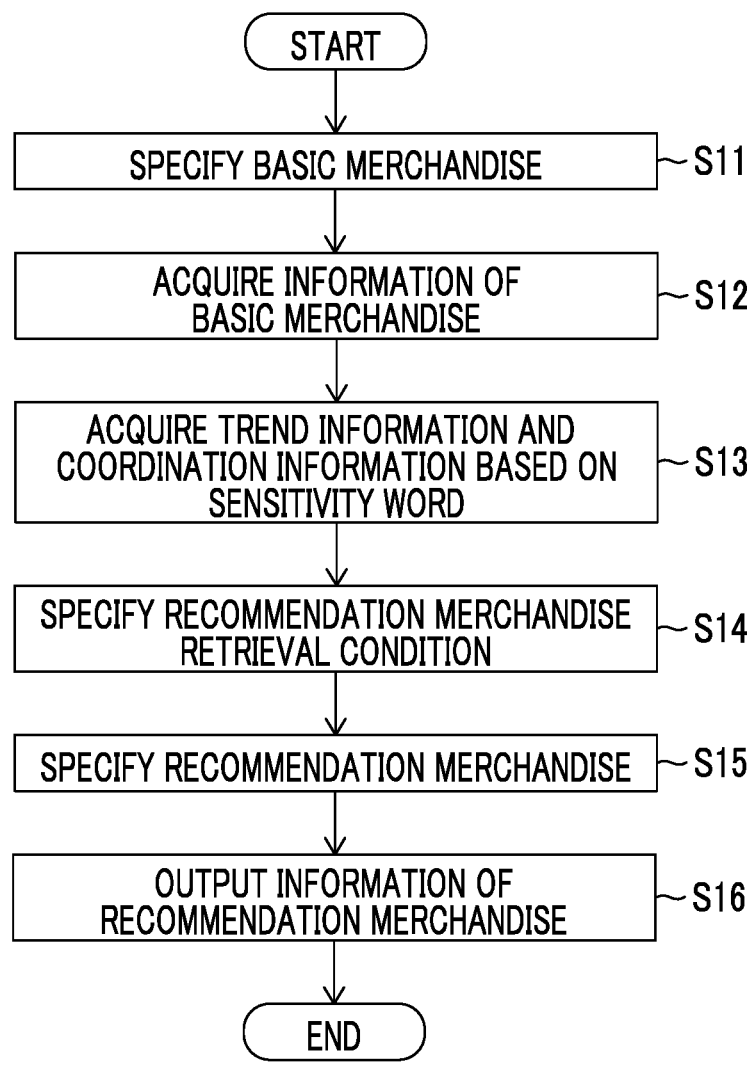
FIG. 9 is a flowchart showing an example of a processing flow of specifying and outputting the recommendation merchandise.

FIG. 9 is a flowchart showing an example of a processing flow of specifying and outputting the recommendation merchandise.

Initially, the basic merchandise (first merchandise) is specified (step S11 of FIG. 9) by the basic merchandise specification unit 31 of the merchandise recommendation device 10, and the information of the basic merchandise is acquired by the basic merchandise information acquisition unit 32 (step S12). The coordination information based on the sensitivity word is acquired by the recommendation merchandise specification unit 33 from the coordination information server 36, and the trend information is acquired from the trend information server 37 (step S13).

A method of acquiring the coordination information based on the sensitivity word is not particularly limited. For example, the recommendation merchandise specification unit 33 may acquire the coordination information specified based on "the sensitivity word (sensitivity word information; for example, "elegant") associated with the user (user identification data)" among the plurality of coordination information items (see FIG. 6) stored in the coordination information server 36. The "sensitivity word (sensitivity word information) associated with the user (user identification data)" may be designated by the user, or may be derived from the user information. For example, the recommendation merchandise specification unit 33 may acquire the "sensitivity word (sensitivity word information) associated with the user (user identification data)" from the user information associated with the user identification data stored in the user database 35.

The recommendation merchandise specification unit 33 specifies the recommendation merchandise associated with the basic merchandise (first merchandise) based on the coordination information based on the sensitivity word and the trend information among the multiple pieces of merchandise belonging to the category different from the category to which the basic merchandise (first merchandise) belongs. More specifically, the recommendation merchandise specification unit 33 specifies a condition (hereinafter, referred to as a "recommendation merchandise retrieval condition") for retrieving the recommendation merchandise based on the information of the basic merchandise, the coordination information based on the sensitivity word, and the trend information (step S14). The recommendation merchandise retrieval condition is not particularly limited. For example, the design feature information (for example, the color information, the pattern information, the shape information, the texture information, and the sensitivity word information of the merchandise) of the merchandise capable of appropriately coordinating with the basic merchandise may be indicated. The recommendation merchandise specification unit 33 specifies, as the "recommendation merchandise associated with the basic merchandise (first merchandise)", the merchandise corresponding to or approximating the recommendation merchandise retrieval condition by referring to the merchandise information stored in the merchandise information server 38 (step S15). The information of the recommendation merchandise is output by the recommendation merchandise information output unit 34 (step S16), and the information of the recommendation merchandise is sent to the terminal device 11 or the EC servers EC0 to ECn.

FIG. 10 is a diagram showing a display example of the recommendation merchandise on the display unit 27 of the terminal device 11. A display form of the recommendation merchandise is not particularly limited. For example, display (hereinafter, referred to as a "recommendation merchandise display") 52 of the recommendation merchandise and display (hereinafter, referred to as a "basic merchandise display") 50 of the basic merchandise may be performed, as shown in FIG. 10. As shown in FIG. 10, the recommendation merchandise display 52 regarding the multiple pieces of recommendation merchandise may be performed, or the recommendation merchandise display 52 regarding the single piece of recommendation merchandise may be performed. As shown in FIG. 10, the recommendation merchandise display 52 regarding the pieces of recommendation merchandise capable of appropriately coordinating with the multiple pieces of basic merchandise, or the recommendation merchandise display 52 regarding the pieces of recommendation merchandise capable of appropriately coordinating with the single piece of basic merchandise may be performed. The basic merchandise display 50 and the recommendation merchandise display 52 on the display unit 27 may be performed under the control of the system controller 28 and the display control unit 25 of the terminal device 11. The user may select the merchandise desired to browse or purchase through the input unit 20 by referring to the recommendation merchandise display 52 of the display unit 27.

Hereinafter, a specific example of the "trend information" will be described.

Figure 11A:
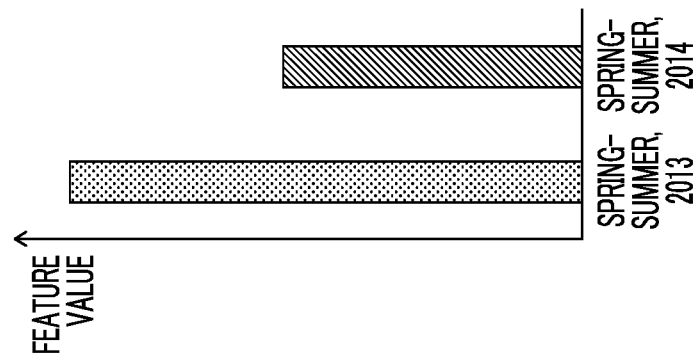
FIGS. 11A to 11C are diagrams showing examples of design feature information of the merchandise registered in the merchandise information server, as sales merchandise "from spring to summer (from April to September), 2013" and "from spring to summer (from April to September), 2014"
Figure 11B:
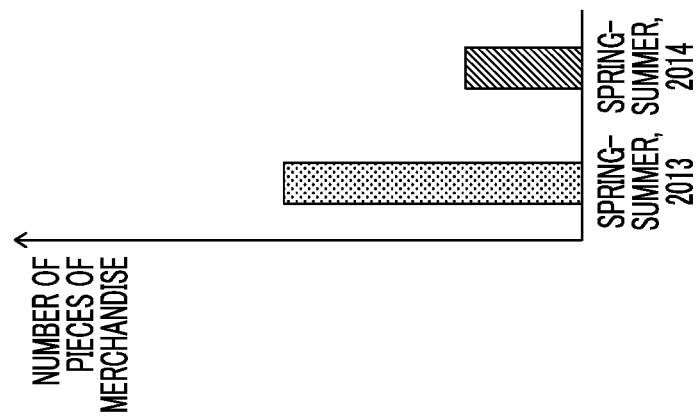
Figure 11C:
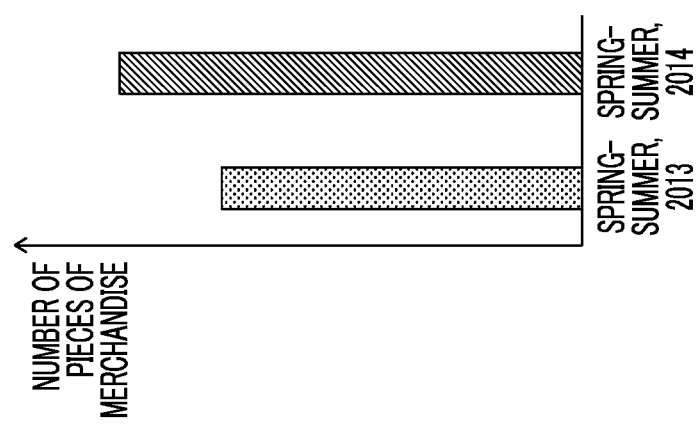

FIGS. 11A to 11C area diagrams showing examples of the design feature information of the merchandise registered in the merchandise information server 38, as the sales merchandise "from spring to summer (from April to September), 2013" and "from spring to summer (from April to September), 2014". FIG. 11A is a graph showing the number of pieces of merchandise of which a representative color is pink, FIG. 11B is a graph showing the number of pieces of merchandise of which a representative pattern is a leopard pattern, and FIG. 11C is a graph showing a size of a representative stripe width as a feature value.

According to the example shown in FIG. 11A, the number of pieces of merchandise of which the representative color is pink "from spring to summer (from April to September), 2014) is greater than the number of pieces of merchandise of which the representative color is pink "from spring to summer (from April to September), 2013". Accordingly, it is preferable that weight of evaluation of the merchandise of which the representative color is pink in the trend information regarding "from spring to summer (from April to September), 2014" is set to be heavier (higher) than that in the trend information regarding "from spring to summer (from April to September), 2013". Similarly, according to the example shown in FIG. 11B, the number of pieces of merchandise of which the representative pattern is the leopard pattern "from spring to summer (from April to September), 2014" is set to be less than the number of pieces of merchandise of which the representative pattern is the leopard pattern "from spring to summer (from April to September), 2013". Accordingly, it is preferable that weight of evaluation of the merchandise of which the representative pattern is the leopard pattern in the trend information regarding "from spring to summer (from April to September), 2014" is set to be lighter (lower) than that in the trend information regarding "from spring to summer (from April to September), 2013". As stated above, the trend information may be determined depending on the "number of pieces of merchandise having the common design feature" using a specific period as a reference.

According to the example shown in FIG. 11C, the size of the representative stripe width of the merchandise "from spring to summer (from April to September), 2014" is set to be less than the size of the representative stripe width of the merchandise "from spring to summer (from April to September), 2013". Accordingly, it is preferable that weight of evaluation of the merchandise of which the stripe width is narrow in the trend information regarding "from spring to summer (from April to September), 2014" is set to be heavier (higher) than that in the trend information regarding "from spring to summer (from April to September), 2013", and it is preferable that weight of evaluation of the merchandise having the stripe width approximating the "representative stripe width" is set to be heavy (high). The trend information may be determined depending on the "representative design feature" using a specific period as a reference. A method of determining the "representative design feature" is not particularly limited. For example, the "representative design feature" may be determined based on an average value or a median value of the design features of the merchandise registered in the merchandise information server 38. For example, in the example shown in FIG. 11C, the "representative stripe width" may be determined by the average value or the median value of the stripe width for the merchandise having the "stripe" pattern among the pieces of merchandise registered in the merchandise information server 38.

The trend information may be determined based on only the specific period (evaluation period), or may be determined depending on a comparison result of the evaluation period and a period (comparison period) different from the evaluation period. For example, in the examples shown in FIGS. 11A and 11B, the evaluation weight may be determined for of the trend information regarding "from spring to summer (from April to September), 2014" depending on the "number of pieces of merchandise having the common design feature" "from spring to summer (from April to September), 2014", or the evaluation weight may be determined depending on a state (for example, ratio) of the "number of pieces of merchandise having the common design feature "from spring to summer (from April to September), 2014" compared with the "number of pieces of merchandise having the common design feature "from spring to summer (from April to September), 2013". Similarly, in the example shown in FIG. 11C, the evaluation weight may be determined for the trend information regarding "from spring to summer (from April to September), 2014" depending on the "representative design feature" "from spring to summer (from April to September), 2014", or the evaluation weight may be determined depending on the state (for example, ratio) of the representative design feature in "from spring to summer (from April to September), 2014" compared with the "representative design feature "from spring to summer (from April to September), 2013".

Accordingly, the trend information acquisition unit 45 (see FIG. 7) may acquire the "number of pieces of merchandise having the common design feature among the multiple pieces of analyzing target merchandise" or the "representative data of the design features of the multiple pieces of analyzing target merchandise" based on the design feature information items of the multiple pieces of analyzing target merchandise, and may acquire the trend information depending on the "number of pieces of merchandise having the common design feature among the multiple pieces of analyzing target merchandise" or the "representative data of the design features of the multiple pieces of analyzing target merchandise". The trend information acquisition unit 45 may acquire the trend information based on the design feature information items of the multiple pieces of analyzing target merchandise during a specific period (for example, "from spring to summer (from April to September), 2014"). The trend information acquisition unit 45 may acquire the trend information based on the design feature information items of the multiple pieces of analyzing target merchandise for a first specific season (for example, "from spring to summer (from April to September), 2014") and the design feature information items of the multiple pieces of analyzing target merchandise for a second specific season (for example, "from spring to summer (from April to September), 2013") different from the first specific period.

Figure 12:
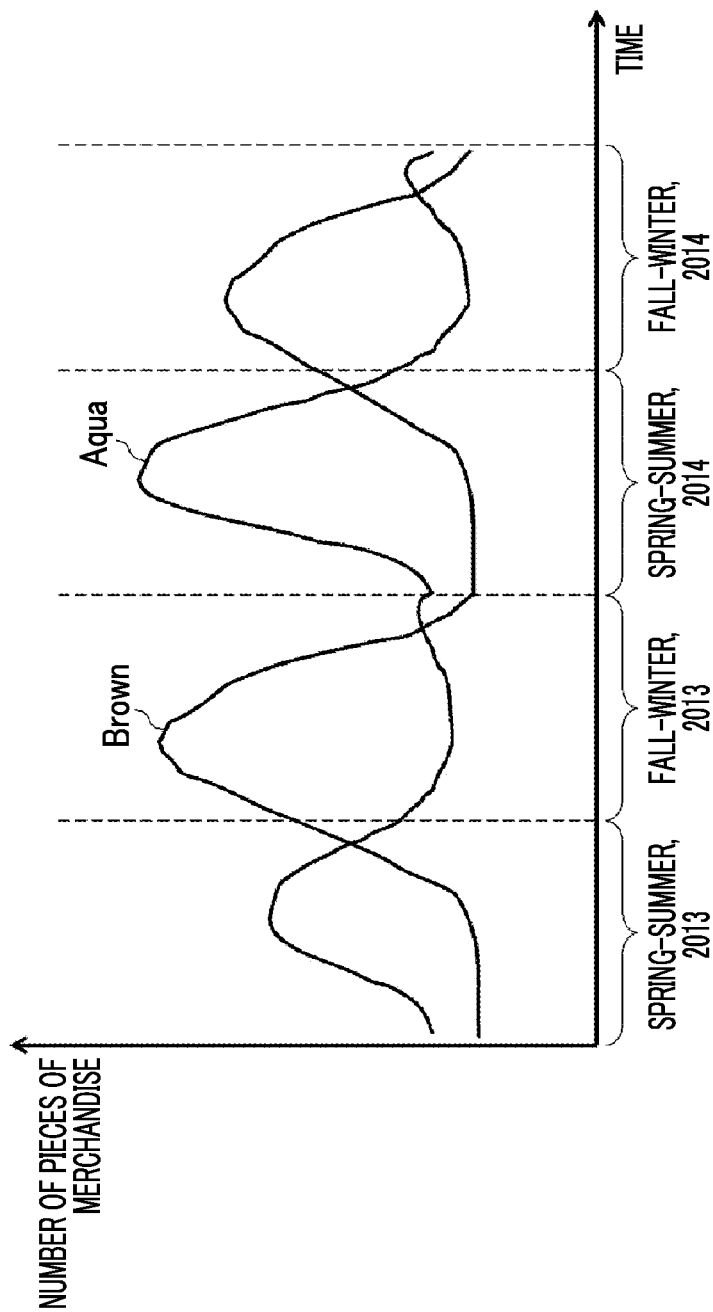
FIG. 12 is a diagram showing another example of the design feature information of the merchandise registered in the merchandise information server, as the sales merchandise, and is a graph showing the "number of pieces of merchandise of which the representative color is brown (see "Brown" of FIG. 12) and the "number of pieces of merchandise of which the representative color is aqua (see "Aqua" of FIG. 12)" using the specific period (from spring (April), 2013 to winter (March), 2014) as a reference.

FIG. 12 is a diagram showing another example of the design feature information of the merchandise registered in the merchandise information server 38, as the sales merchandise, and is a graph showing the "number of pieces of merchandise of which the representative color is brown (see "Brown" of FIG. 12)" and the "number of pieces of merchandise of which the representative color is aqua (see "Aqua" of FIG. 12)" using the specific period (from spring (April), 2013 to winter (March), 2014) as a reference.

In general, there is a tendency that the clothing accessories of "Aqua" is in fashion during a period of "spring—summer" and the clothing accessories of "Brown" is in fashion during a period of "fall—winter", but a specific degree of a trend may be varied year to year. The number of increased or decreased pieces of merchandise (hereinafter, referred to as a "merchandise number slope") during a reference period may be used as reference for determining such a degree of a trend. That is, the trend information acquisition unit 45 (see FIG. 7) may acquire the trend information depending on the number of increased or decreased pieces of merchandise having the common design feature (the representative color of "Aqua" or "Brown" in the example shown in FIG. 12) during the reference period.

More specifically, the trend information acquisition unit 45 may acquire the trend information by comparing the number of increased pieces of merchandise having the common design feature during the reference period with a first threshold. For example, in a case where the "number of increased pieces of merchandise having the common design feature during the reference period" exceeds the first threshold, the trend information is determined by setting the evaluation weight regarding the merchandise having the common design feature to be heavier (higher). In a case where the "number of decreased pieces of merchandise having the common design feature during the reference period" exceeds a second threshold, the trend information is determined by setting the evaluation weight regarding the merchandise having the common design feature to be lighter (lower). As stated above, the merchandise appropriate for the trend may be specified as the recommendation merchandise by determining the trend information depending on the merchandise number slope.

The "reference period" is not particularly limited. For example, one day (24 hours), one week (seven days), two weeks (fourteen days), or one month may be set as the "reference period".

Figure 13:
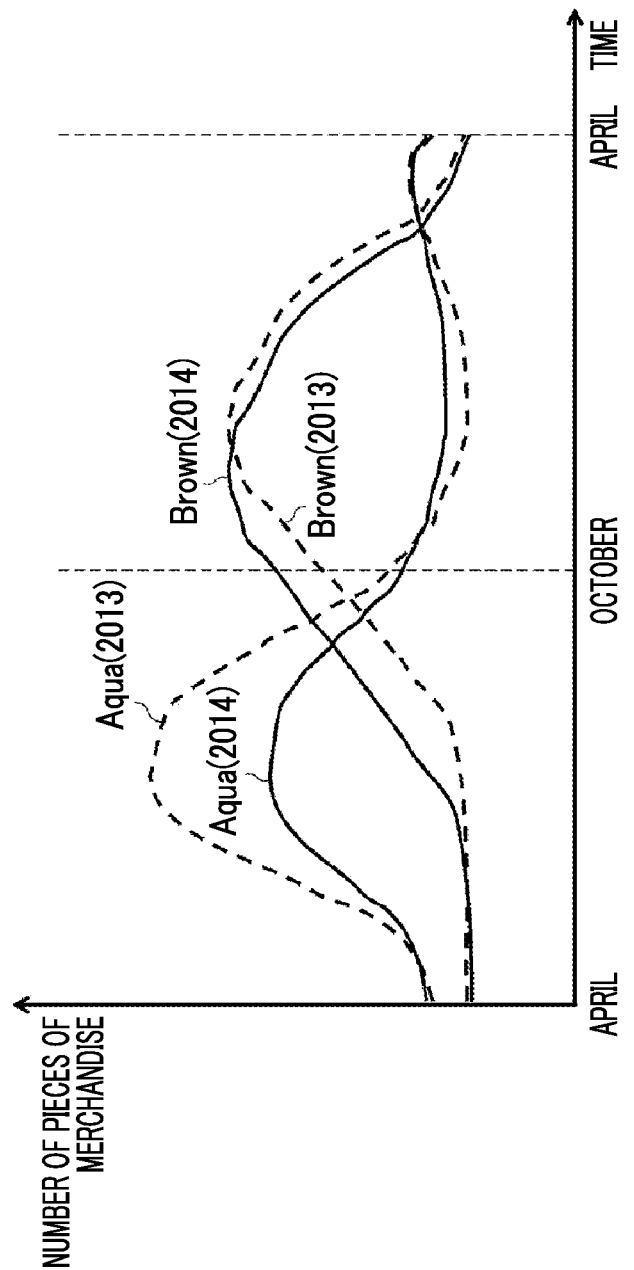
FIG. 13 is a diagram showing another example of the design feature information of the merchandise registered in the merchandise information server, as the sales merchandise, and is a graph showing the "number of pieces of merchandise of which the representative color is brown (see "Brown (2013)" and "Brown (2014)" of FIG. 13)" and the "number of pieces of merchandise of which the representative color is aqua (see "Aqua (2013)" and "Aqua (2014)" of FIG. 13)" using the specific periods (2013 and 2014) as the reference.

FIG. 13 is a diagram showing another example of the design feature information of the merchandise registered in the merchandise information server 38, as the sales merchandise, and is a graph showing the "number of pieces of merchandise of which the representative color is brown (see "Brown (2013)" and "Brown (2014)" of FIG. 13)" and the "number of pieces of merchandise of which the representative color is aqua (see "Aqua (2013)" and "Aqua (2014)" of FIG. 13)" using the specific periods (2013 and 2014) as the reference. In FIG. 13, "Brown (2013)" represents the "number of pieces of merchandise of which the representative color is brown" in 2013, "Brown (2014)" represents the "number of pieces of merchandise of which the representative color is brown" in 2014, "Aqua (2013) represents the "number of pieces of merchandise of which the representative color is aqua in 2013, and "Aqua (2014)" represents the "number of pieces of merchandise of which the representative color is aqua" in 2014.

As mentioned above, there is a tendency that the clothing accessories of "Aqua" are in fashion during a period of "spring—summer", whereas the clothing accessories of "Brown" are in fashion during a period of "fall—winter", but a specific timing of the trend may be varied year to year. A season when the number of pieces of merchandise rises may be used as a reference for determining the timing of the trend. A method of determining the season when the number of pieces of merchandise rises is not limited. For example, the season when the number of pieces of merchandise rises may be determined depending on an absolute value or the number of increased pieces of merchandise having the design feature. Accordingly, the trend information acquisition unit 45 (see FIG. 7) may acquire the trend information depending on the season when the number of increased pieces of merchandise having the common design feature (in the example shown in FIG. 13, the representative color of "Aqua" or "Brown") during the reference period exceeds the first threshold. The trend information acquisition unit 45 may acquire the trend information depending on the season when the number of pieces of merchandise having the common design feature exceeds the second threshold.

Particularly, in a case where the season when the number of pieces of merchandise rises is earlier than a season when past trend information (for example, trend information one year ago) is used, the trend information may be determined by setting the evaluation weight regarding the merchandise having the design feature to be heavier (higher). Meanwhile, in a case where the season when the number of pieces of merchandise rises is later than the season when the past trend information is used, the trend information may be determined by setting the evaluation weight regarding the merchandise having the design feature to be lighter (lower).

The above-described functional configuration may be realized by arbitrary hardware, software, or a combination of them. For example, the present invention may be applied to a non-transitory computer readable recording medium storing a program for causing a computer to perform the processing methods (merchandise recommendation methods) and controlling methods (controlling procedures) in the respective units of the merchandise recommendation device 10 and the terminal device 11 which are described above, a computer-readable recording medium (non-transitory recording medium) that records the program, or a computer in which the program is installed. Particularly, the above-described processes in the terminal device 11 may be performed on dedicated application software, or may be performed on a browser.

The form of the terminal device 11 of the present invention is not particularly limited, and includes a cellular phone, a smartphone, a personal digital assistant (PDA), and a portable game machine. Hereinafter, an example of the smartphone to which the present invention may be applied will be described.

<Configuration of Smartphone>

Figure 14:
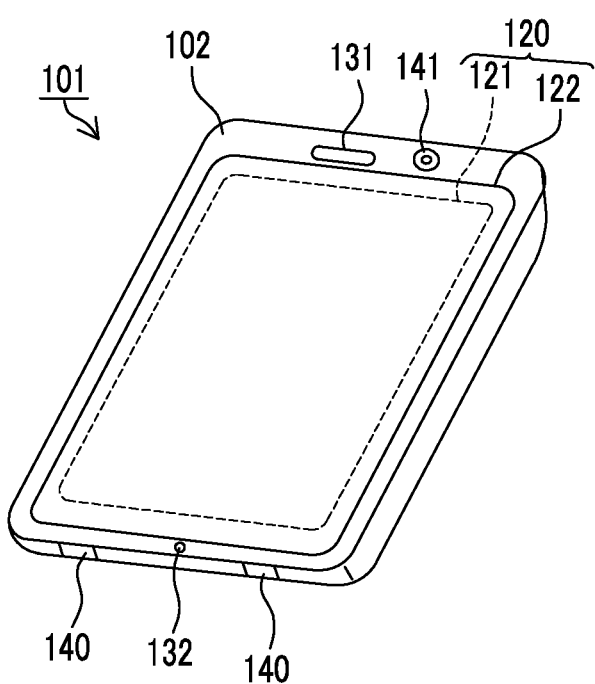
FIG. 14 is a diagram showing an external appearance of a smartphone.

FIG. 14 is a diagram showing an external appearance of the smartphone 101 which is the embodiment of an imaging device of the present invention. The smartphone 101 shown in FIG. 14 includes a plate-like housing 102, and includes a display input unit 120 in which a display panel 121 as a display unit and an operation panel 122 as an input unit are integrally provided on one surface of the housing 102. The housing 102 includes a speaker 131, a microphone 132, an operation unit 140, and a camera unit 141. A configuration of the housing 102 is not limited, and the housing may have a configuration in which the display unit and the input unit are independently provided, may have a folding structure, or may include a sliding mechanism.

Figure 15:
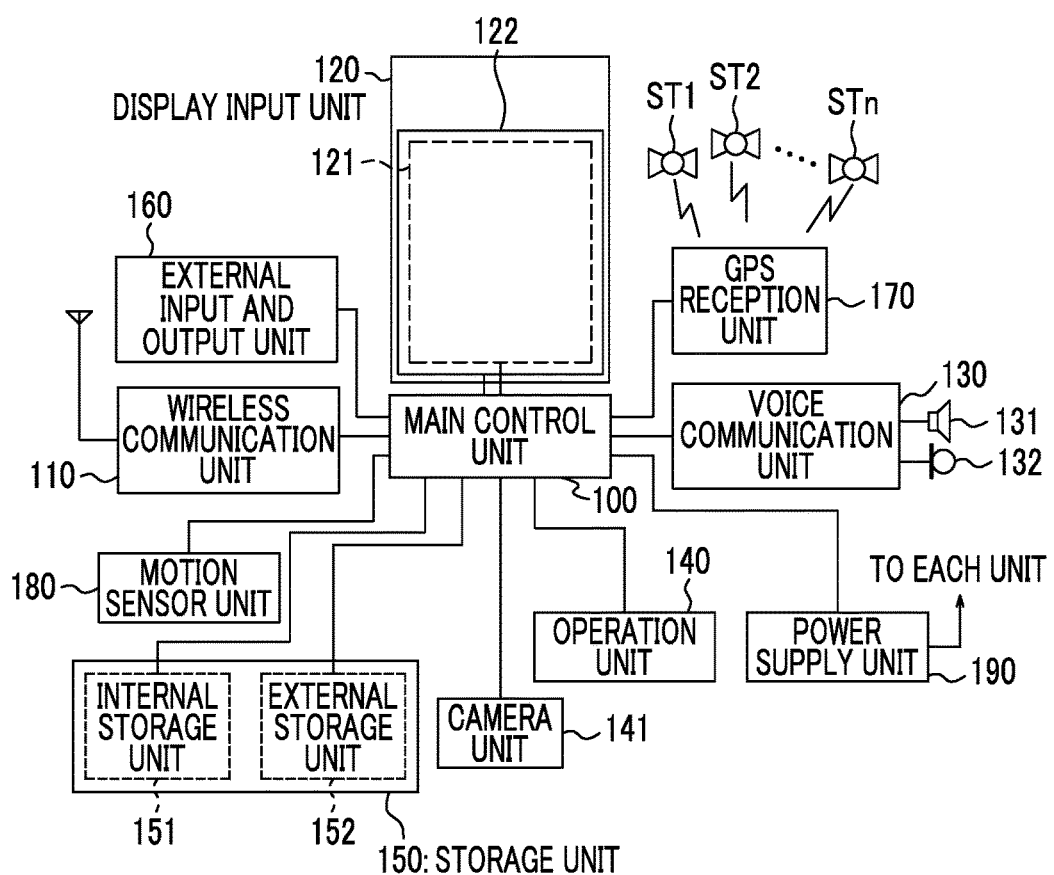
FIG. 15 is a block diagram showing a configuration of the smartphone shown in FIG. 14.

FIG. 15 is a block diagram showing the configuration of the smartphone 101 shown in FIG. 14. As shown in FIG. 15, as main constituent elements, the smartphone 101 includes a wireless communication unit 110, the display input unit 120, a voice communication unit 130, the operation unit 140, the camera unit 141, a storage unit 150, an external input and output unit 160, a Global Positioning System (GPS) reception unit 170, a motion sensor unit 180, a power supply unit 190, and a main control unit 100. As a main function, the smartphone 101 has a wireless communication function of performing mobile wireless communication with a base station apparatus via a mobile communication network.

The wireless communication unit 110 performs wireless communication with the base station apparatus connected to the mobile communication network according to an instruction of the main control unit 100. Through the wireless communication, various file data items such as voice data and image data and electronic mail data are transmitted and received and web data or streaming data is received.

The display input unit 120 is a so-called touch panel that includes the display panel 121 and the operation panel 122, and visually supplies information to the user by displaying an image (still image or moving image) or character information and detects a user operation for the displayed information under the control of the main control unit 100.

The display panel 121 uses a liquid crystal display (LCD) or an organic electro-luminescence display (OELD) as a display device. The operation panel 122 is a device that is provided so as to cause an image displayed on a display surface of the display panel 121 to be visually perceived and detects one or a plurality of coordinates operated by the finger of the user or a stylus. If the device is operated by the finger of the user or the stylus, the operation panel 122 outputs a detection signal generated by the operation to the main control unit 100. Subsequently, the main control unit 100 detects an operation position (coordinates) on the display panel 121 based on the received detection signal.

As the embodiment of the imaging device of the present invention, the display input unit 120 is configured such that the display panel 121 and the operation panel 122 of the smartphone 101 illustrated in FIG. 14 are integrally provided, and the operation panel 122 is disposed so as to completely cover the display panel 121. In a case where the display input unit is disposed in this manner, the operation panel 122 may also have a function of detecting the user operation in a region other than the display panel 121. In other words, the operation panel 122 may include a detection region (hereinafter, referred to as a "display region") for an overlapping portion which overlaps the display panel 121 and a detection region (hereinafter, referred to as a "non-display region") for an outer edge portion which does not overlap with the display panel 121.

A size of the display region and a size of the display panel 121 may completely match each other, or these sizes do not necessarily match each other. The operation panel 122 may include two sensitive regions including the outer edge portion and an inner portion other than the outer edge. A width of the outer edge portion is appropriately designed depending on a size of the housing 102. As a position detection method employed by the operation panel 122, there are a matrix switch method, a resistive layer method, a surface acoustic wave method, an infrared-light method, an electromagnetic induction method, and a capacitive method. Any method may be employed.

The voice communication unit 130 includes the speaker 131 and the microphone 132, and is a unit that converts user's voice input through the microphone 132 into voice data capable of being processed by the main control unit 100 to output the converted voice data to the main control unit 100 and decodes the voice data received by the wireless communication unit 110 or the external input and output unit 160 to output the decoded voice data through the speaker 131. For example, the speaker 131 may be mounted on the same surface as the surface on which the display input unit 120 is provided as shown in FIG. 14, and the microphone 132 may be mounted on a side surface of the housing 102.

The operation unit 140 is a hardware key using a key switch, and receives an instruction from the user. For example, as shown in FIG. 14, the operation unit 140 is a push-button type switch that is mounted on a side surface of the housing 102 of the smartphone 101, is switched on if the user presses the operation unit with their finger, and is switched off due to a restoring force of a spring if the user removes their finger.

The storage unit 150 stores a control program or control data of the main control unit 100, application software, address data acquired by associating a name and a telephone number of a communication partner, data of transmitted and received electronic mails, web data downloaded through a web browser, and downloaded content data, and temporarily stores streaming data. The storage unit 150 includes an internal storage unit 151 built in the smartphone and an external storage unit 152 having an external memory slot capable of being detachably attached. The internal storage unit 151 and the external storage unit 152 constituting the storage unit 150 are realized using a storage medium such as a flash memory type, a hard disk type, a multimedia card micro type, a card type memory (for example, MicroSD (registered trademark) memory), a random access memory (RAM), and a read only memory (ROM).

The external input and output unit 160 functions as an interface of all external devices connected to the smartphone 101, and is directly or indirectly connected to another external device through communication (for example, universal serial bus (USB) or IEEE 1394 determined by the Institute of Electrical and Electronics Engineers, Inc. (IEEE) or a network (for example, the Internet, a wireless local area network (LAN), Bluetooth (registered trademark), radio frequency identification (RFID), the Infrared Data Association (IrDA) (registered trademark), Ultra-wideband (UWB) (registered trademark), or ZigBee (registered trademark)).

For example, as the external device connected to the smartphone 101, there are wired or wireless headsets, wired or wireless external chargers, wired or wireless data ports, a memory card, a subscriber identity module card (SIM), or a user identity module card (UIM) card which is connected through a card socket, external audio and video devices connected through audio and video input and output (I/O) terminals, external audio and video devices connected in a wireless manner, a smartphone connected in a wired or wireless manner, a personal computer connected in a wired or wireless manner, a PDA connected in a wired or wireless manner, or an earphone connected in a wired or wireless manner. The external input and output unit 160 may deliver data received from such external device to the internal constituent elements of the smartphone 101 or may transmit internal data of the smartphone 101 to the external device.

According to the instruction of the main control unit 100, the GPS reception unit 170 receives GPS signals transmitted from GPS satellites ST1, and ST2 to STn, performs a positioning computation process based on the plurality of received GPS signals, and detects a position specified by latitude, longitude, and altitude of the smartphone 101. In a case where positional information is able to be acquired from the wireless communication unit 110 and/or the external input and output unit 160 (for example, wireless LAN), the GPS reception unit 170 may detect the position by using the positional information.

For example, the motion sensor unit 180 includes a tri-axial acceleration sensor, and detects a physical movement of the smartphone 101 according to the instruction of the main control unit 100. The physical movement of the smartphone 101 is detected, and thus, acceleration or a movement direction of the smartphone 101 is detected. The detection result is output to the main control unit 100.

The power supply unit 190 supplies power accumulated in a battery (not shown) to the respective units of the smartphone 101 according to the instruction of the main control unit 100.

The main control unit 100 includes a microprocessor, and is operated according to the control program or the control data stored in the storage unit 150. The main control unit generally controls the respective units of the smartphone 101. The main control unit 100 has an application processing function and a mobile communication control function of controlling the respective units of a communication system in order to perform voice communication and data communication through the wireless communication unit 110.

The main control unit 100 is operated according to the application software stored in the storage unit 150, and thus, the application processing function is realized. For example, as the application processing function, there are an infrared communication function of performing data communication with a counterpart device, an electronic mail function of transmitting and receiving electronic emails, and a web browsing function of displaying web pages by controlling the external input and output unit 160.

The main control unit 100 has an image processing function of displaying a video on the display input unit 120 based on image data (data of still image or moving image) such as the received data or downloaded streaming data. The image processing function refers to a function of the main control unit 100 that decodes the image data, performs image processing on the decoded result, and displays the image acquired through the image processing on the display input unit 120.

The main control unit 100 performs display control for the display panel 121 and operation detection control for detecting the user operation performed through the operation unit 140 and the operation panel 122.

Through the display control, the main control unit 100 displays an icon for activating the application software or a software key such as a scrollbar, or displays a window for writing the electronic mail. The scrollbar refers to a software key for receiving an instruction to move a display portion of an image for an image larger than a display region of the display panel 121.

Through the operation detection control, the main control unit 100 detects the user operation performed through the operation unit 140, receives an operation for the icon or an input of a character string in an input field of the window through the operation panel 122, or receives a scrolling request of the display image through the scrollbar.

Through the operation detection control, the main control unit 100 has a touch panel control function of determining whether an operation position for the operation panel 122 corresponds to an overlapping portion (display region) which overlaps the display panel 121 or corresponds to an outer edge portion (non-display region) which does not overlap the display panel 121 and controlling a sensitive region of the operation panel 122 or a display position of the software key.

The main control unit 100 may detect a gesture operation for the operation panel 122, and may perform a preset function in response to the detected gesture operation. The gesture operation refers to not a simple touch operation of the related art but an operation of drawing a trace with the finger, simultaneously designating a plurality of positions, or drawing a trace for at least one of the plurality of positions through a combination thereof.

The camera unit 141 is a digital camera that electronically images by using an imaging element such as a complementary metal oxide semiconductor (CMOS). Under the control of the main control unit 100, the camera unit 141 may convert the imaged image data into image data acquired by performing compression such as the Joint Photographic Experts Group (JPEG) on the imaged image data, may record the converted image data in the storage unit 150, or may output the image data through the external input and output unit 160 or the wireless communication unit 110. Although the camera unit 141 is mounted on the same surface as that of the display input unit 120 in the smartphone 101 shown in FIG. 14, the mounting position of the camera unit 141 is not limited thereto. The camera unit 141 may be mounted on not a front surface of the housing 102 on which the display input unit 120 is provided but on a rear surface of the housing 102, or a plurality of camera units 141 may be mounted on the housing 102. In a case where the plurality of camera units 141 is mounted, the imaging may be performed by a single camera unit 141 while switching between the camera units 141 to be used in the imaging or may be simultaneously performed by using the plurality of camera units 141.

The camera unit 141 may use various functions of the smartphone 101. For example, the image acquired by the camera unit 141 may be displayed on the display panel 121, or an image acquired by being imaged by the camera unit 141 by using one of operation input methods of the operation panel 122 may be used. When the GPS reception unit 170 detects the position, the GPS reception unit may detect the position by referring to the image from the camera unit 141. An optical axis direction of the camera unit 141 of the smartphone 101 or a current utilization environment may be determined by referring to the image from the camera unit 141 without using the tri-axial acceleration sensor or by using the tri-axial acceleration sensor. Of course, the image from the camera unit 141 may be used within the application software.

In addition, data acquired by adding the positional information acquired by the GPS reception unit 170, voice information (may be text information acquired by the main control unit that performs voice-to-text conversion) acquired by the microphone 132, and posture information acquired by the motion sensor unit 180 to the data of the still image or the moving image may be recorded in the storage unit 150 or may be output through the external input and output unit 160 or the wireless communication unit 110.

EXPLANATION OF REFERENCES

1: client server system
10: merchandise recommendation device
11: terminal device
12: network
15: user ID data input field
16: password input field
17: software keyboard
20: input unit
21: transmission unit
22: reception unit
23: communication unit
25: display control unit
27: display unit
28: system controller
31: basic merchandise specification unit
32: basic merchandise information acquisition unit
33: recommendation merchandise specification unit
34: recommendation merchandise information output unit
35: user database
36: coordination information server
37: trend information server
38: merchandise information server
41: basic information acquisition unit
42: recommendation merchandise determination unit
45: trend information acquisition unit
46: trend information database
50: basic merchandise display
52: recommendation merchandise display
100: main control unit
101: smartphone
102: housing
110: wireless communication unit 120: display input unit
121: display panel
122: operation panel
130: voice communication unit
131: speaker
132: microphone
140: operation unit
141: camera unit
150: storage unit
151: internal storage unit
152: external storage unit
160: external input and output unit
170: GPS reception unit
180: motion sensor unit
190: power supply unit

What is claimed is:

1. A merchandise recommendation device comprising:
a trend information acquisition unit that acquires the fashion trend information based on analyzing design feature information items of multiple pieces;
a basic merchandise specification unit that specifies first merchandise according to a user identification and merchandise information received from a terminal device in response to a user input;
a recommendation merchandise specification unit that specifies recommendation merchandise which is associated with the first merchandise, among multiple pieces of merchandise belonging to a category different from a category to which the first merchandise belongs, based on the fashion trend information and coordination information based on a sensitivity word, wherein the category of the recommendation merchandise is received from the terminal device in response to the user input; and
a recommendation merchandise information output unit that outputs information of the recommendation merchandise to the terminal device;
wherein the recommendation merchandise is specified based on an evaluation score calculated by using an evaluation weight adjusted according to the fashion trend information acquired according to a specific season,
the evaluation weight is acquired based on the coordination information based on the sensitivity word acquired by matching the sensitivity word to the design feature information items comprising color, pattern, shape, or texture information.

2. The merchandise recommendation device according to claim 1, wherein
the trend information acquisition unit that analyzes design feature information items of multiple pieces of analyzing target merchandise, and acquires the fashion trend information.

3. The merchandise recommendation device according to claim 2,
wherein the trend information acquisition unit acquires the number of pieces of merchandise having a common design feature among the multiple pieces of analyzing target merchandise, and acquires the trend information depending on the number of pieces of merchandise having the common design feature.

4. The merchandise recommendation device according to claim 3,
wherein the trend information acquisition unit acquires the trend information depending on the number of increased or decreased pieces of merchandise having the common design feature during a reference period.

5. The merchandise recommendation device according to claim 4,
wherein the trend information acquisition unit acquires the trend information by comparing the number of increased pieces of merchandise having the common design feature during the reference period with a first threshold.

6. The merchandise recommendation device according to claim 5,
wherein the trend information acquisition unit acquires the trend information depending on a season when the number of increased pieces of merchandise having the common design feature during the reference period exceeds the first threshold.

7. The merchandise recommendation device according to trend claim 3,
wherein the trend information acquisition unit acquires the trend information depending on a season when the number of pieces of merchandise having the common design feature exceeds a second threshold.

8. The merchandise recommendation device according to trend claim 2,
wherein the trend information acquisition unit acquires the trend information based on the design feature information items of the multiple pieces of analyzing target merchandise in a first specification season and the design feature information items of the multiple pieces of analyzing target merchandise in a second specification season different from the first specification season.

9. The merchandise recommendation device according to trend claim 2,
wherein the trend information acquisition unit acquires representative data items of design features of the multiple pieces of analyzing target merchandise, and acquires the trend information depending on the representative data items.

10. The merchandise recommendation device according to trend claim 2,
wherein the multiple pieces of analyzing target merchandise are based on sales merchandise.

11. The merchandise recommendation device according to trend claim 2,
wherein the multiple pieces of analyzing target merchandise are based on merchandise belonging to a specific store.

12. The merchandise recommendation device according to trend claim 2,
wherein the multiple pieces of analyzing target merchandise are based on merchandise belonging to a specific brand.

13. The merchandise recommendation device according to trend claim 2,
wherein the multiple pieces of analyzing target merchandise are based on merchandise belonging to a specific community.

14. The merchandise recommendation device according to trend claim 2,
wherein the multiple pieces of analyzing target merchandise are based on merchandise belonging to an individual.

15. The merchandise recommendation device according to trend claim 2,
wherein the design feature information is based on a sensitivity word derived from at least one of color information, pattern information, shape information, or texture information.

16. The merchandise recommendation device according to trend claim 1,
wherein the first merchandise is a single piece of merchandise.

17. The merchandise recommendation device according to trend claim 1,
wherein the first merchandise is multiple pieces of merchandise.

18. The merchandise recommendation device according to trend claim 1,
wherein the recommendation merchandise is clothing accessories.

19. The merchandise recommendation device according to trend claim 1,
wherein the basic merchandise specification unit specifies the first merchandise based on terminal transmission information sent from a terminal device.

20. A merchandise recommendation method comprising:
a step of acquiring fashion trend information based on analyzing design feature information items of multiple pieces;
a step of specifying first merchandise according to a user identification and merchandise information received from a terminal device in response to a user input;
a step of specifying recommendation merchandise associated with the first merchandise, among multiple pieces of merchandise belonging to a category different from a category to which the first merchandise belongs, based on the fashion trend information and coordination information based on a sensitivity word, wherein the category of the recommendation merchandise is received from the terminal device in response to the user input; and
a step of outputting information of the recommendation merchandise to the terminal device;
wherein the recommendation merchandise is specified based on an evaluation score calculated by using an evaluation weight adjusted according to the fashion trend information acquired according to a specific season,
the evaluation weight is acquired based on the coordination information based on the sensitivity word acquired by matching the sensitivity word to the design feature information items comprising color, pattern, shape, or texture information.

21. A non-transitory computer readable recording medium storing a program causing a computer to perform:
a procedure of acquiring fashion trend information based on analyzing design feature information items of multiple pieces;
a procedure of specifying first merchandise according to a user identification and merchandise information received from a terminal device in response to a user input;
a procedure of specifying recommendation merchandise associated with the first merchandise, among multiple pieces of merchandise belonging to a category different from a category to which the first merchandise belongs, based on the fashion trend information and coordination information based on a sensitivity word, wherein the category of the recommendation merchandise is received from the terminal device in response to the user input; and
a procedure of outputting information of the recommendation merchandise to the terminal device:
wherein the recommendation merchandise is specified based on an evaluation score calculated by using an evaluation weight adjusted according to the fashion trend information acquired according to a specific season,
the evaluation weight is acquired based on the coordination information based on the sensitivity word acquired by matching the sensitivity word to the design feature information items comprising color, pattern, shape, or texture information.

* * * * *